US011303935B2

(12) United States Patent
Rusanovskyy et al.

(10) Patent No.: US 11,303,935 B2
(45) Date of Patent: Apr. 12, 2022

(54) DERIVING CODING SYSTEM OPERATIONAL CONFIGURATION

(71) Applicant: QUALCOMM Incorporated, San Diego, CA (US)

(72) Inventors: Dmytro Rusanovskyy, San Diego, CA (US); Adarsh Krishnan Ramasubramonian, Irvine, CA (US)

(73) Assignee: Qualcomm Incorporated, San Diego, CA (US)

( * ) Notice: Subject to any disclaimer, the term of this patent is extended or adjusted under 35 U.S.C. 154(b) by 0 days.

(21) Appl. No.: 16/924,941

(22) Filed: Jul. 9, 2020

(65) Prior Publication Data

US 2021/0014535 A1    Jan. 14, 2021

Related U.S. Application Data

(60) Provisional application No. 62/926,145, filed on Oct. 25, 2019, provisional application No. 62/912,526, filed on Oct. 8, 2019, provisional application No. 62/872,637, filed on Jul. 10, 2019.

(51) Int. Cl.
*H04N 19/70* (2014.01)
*H04N 19/44* (2014.01)

(52) U.S. Cl.
CPC ............. *H04N 19/70* (2014.11); *H04N 19/44* (2014.11)

(58) Field of Classification Search
CPC ......... H04N 19/70; H04N 19/44; H04N 19/12
See application file for complete search history.

(56) References Cited

U.S. PATENT DOCUMENTS

| | | | |
|---|---|---|---|
| 2011/0099594 A1* | 4/2011 | Chen | H04N 21/8456 725/105 |
| 2013/0287093 A1* | 10/2013 | Hannuksela | H04N 19/30 375/240.02 |
| 2014/0168362 A1* | 6/2014 | Hannuksela | H04N 13/161 348/43 |
| 2015/0172692 A1* | 6/2015 | Yang | H04N 19/119 375/240.26 |

(Continued)

OTHER PUBLICATIONS

Boyce et al. "Interoperability point signaling for VCC", Joint Video Experts Team (JVET) of ITU-T SG 16 WP 3 and ISO/IEC JTC 1/SC29/WG 11 11th Meeting: Ljubljanam SI, Jul. 10-18, 2018 (Year: 2018).*

(Continued)

*Primary Examiner* — Richard A Hansell, Jr.
(74) *Attorney, Agent, or Firm* — Shumaker & Sieffert, P.A.

(57) ABSTRACT

A device for coding video data, the device comprising a memory configured to store video data; and one or more processors implemented in circuitry and configured to: code a value for a profile indicator syntax element in a bitstream including video data, the value for the profile indicator representing a class of a profile to which the bitstream conforms; code one or more values representing one or more coding-tool-specific constraints, separate from the profile indicator syntax element, each of the coding-tool-specific constraints indicating whether coding tools corresponding to the coding-tool-specific constraints can be enabled for at least a subset of the bitstream; and code the video data according to the coding-tool-specific constraints and the class of the profile.

37 Claims, 8 Drawing Sheets

(56) References Cited

U.S. PATENT DOCUMENTS

| | | | | |
|---|---|---|---|---|
| 2020/0413072 | A1* | 12/2020 | Filippov | H04N 19/46 |
| 2021/0211735 | A1* | 7/2021 | Stockhammer | H04N 21/43 |
| 2021/0314587 | A1* | 10/2021 | Choi | H04N 19/70 |
| 2021/0321114 | A1* | 10/2021 | Hannuksela | G06F 16/50 |

OTHER PUBLICATIONS

Bjontegaard G., "Calculation of Average PSNR Differences Between RD-curves", VCEG-M33, ITU-Telecommunications Standardization Sector, Study Group 16 Question 6, Video Coding Experts Group (VCEG), 13th Meeting, Austin, Texas, USA, Apr. 2-4, 2001, pp. 1-4.

Boyce (Intel) J., et al., "Interoperability Point Signaling for WC", 11. JVET Meeting, Jul. 11, 2018-Jul. 18, 2018, Ljubljana, (The Joint Video Exploration Team of ISO/IEC JTC1/SC29/WG11 and ITU-TSG.16), No. JVET-K0311, Aug. 30, 2018 (Aug. 30, 2018), XP030249821, pp. 1-4, Retrieved from the Internet: URL: http://phenix.int-evry.fr/jvet/doc_end_user/documents/11_Ljubljana/wg11/JVET-K0311-v2.zip JVET-K0311v1.docx, [retrieved on Aug. 30, 2018], the whole document.

Bross B., et al., "Versatile Video Coding (Draft 5)", Joint Video Experts Team (JVET) of ITU-T SG 16 WP 3 and ISO/IEC JTC 1/SC 29/WG 11, 14th Meeting: Geneva, CH, Mar. 19-27, 2019, JVET-N1001-V3, 371 pages.

Chen J., et al., "Algorithm Description of Joint Exploration Test Model 1", 1. JVET Meeting, Oct. 19-21, 2015, Geneva (The Joint Video Exploration Team of ISO/IEC JTC1/SC29/WG11 and ITU-T SG.16 WP 3), No. JVET-A1001, Feb. 24, 2016 (Feb. 24, 2016), XP030150000, 27 Pages, URL: http://phenix.int-evry.fr/jvet/.

Choi K., et al., "Text of ISO/IEC CD 23094-1, Essential Video Coding", Coding of Moving Pictures and Audio, ISO/IEC JTC1/SC29/WG11, N18568, Gothenburg, Sweden, Jul. 22, 2019, 292 Pages.

International Search Report and Written Opinion—PCT/US2020/041665—ISAEPO—dated Sep. 25, 2020.

ITU-T H.265, Series H: Audiovisual and Multimedia Systems, Infrastructure of Audiovisual Services—Coding of Moving Video, High Efficiency Video Coding, The International Telecommunication Union, Jun. 2019, 696 Pages.

Lainema: "Main and Extended Profile Interoperability", 7. JVT Meeting, 64. MPEG Meeting, Mar. 7, 2003-Mar. 14, 2003, Pattaya,TH, (Joint Video Team of ISO/IEC JTC1/SC29/WG11 and ITU-TSG.16 ), No. JVT-G018, Mar. 14, 2003 (Mar. 14, 2003), XP030005682, pp. 1-9, Sections "Introduction", "Proposal" and "Proposed Changes to the Draft".

Rusanovskyy D., et al., "[EVC] On Enabling Toolset Signalling for EVC", Coding of Moving Pictures and Audio, ISO/IEC JTC1/SC29/WG11 MPEG2018/m51483, Oct. 2019, Geneva, Switzerland, 5 Pages.

* cited by examiner

DERIVING CODING SYSTEM OPERATIONAL CONFIGURATION

This application claims the benefit of U.S. Provisional Application No. 62/872,637, filed Jul. 10, 2019, U.S. Provisional Application No. 62/912,526, filed Oct. 8, 2019, and U.S. Provisional Application No. 62/926,145, filed Oct. 25, 2019, the entire contents of each of which are hereby incorporated by reference.

TECHNICAL FIELD

This disclosure relates to video coding, including video encoding and video decoding.

BACKGROUND

Digital video capabilities can be incorporated into a wide range of devices, including digital televisions, digital direct broadcast systems, wireless broadcast systems, personal digital assistants (PDAs), laptop or desktop computers, tablet computers, e-book readers, digital cameras, digital recording devices, digital media players, video gaming devices, video game consoles, cellular or satellite radio telephones, so-called "smart phones," video teleconferencing devices, video streaming devices, and the like. Digital video devices implement video coding techniques, such as those described in the standards defined by MPEG-2, MPEG-4, ITU-T H.263, ITU-T H.264/MPEG-4, Part 10, Advanced Video Coding (AVC), ITU-T H.265/High Efficiency Video Coding (HEVC), and extensions of such standards. The video devices may transmit, receive, encode, decode, and/or store digital video information more efficiently by implementing such video coding techniques.

Video coding techniques include spatial (intra-picture) prediction and/or temporal (inter-picture) prediction to reduce or remove redundancy inherent in video sequences. For block-based video coding, a video slice (e.g., a video picture or a portion of a video picture) may be partitioned into video blocks, which may also be referred to as coding tree units (CTUs), coding units (CUs) and/or coding nodes. Video blocks in an intra-coded (I) slice of a picture are encoded using spatial prediction with respect to reference samples in neighboring blocks in the same picture. Video blocks in an inter-coded (P or B) slice of a picture may use spatial prediction with respect to reference samples in neighboring blocks in the same picture or temporal prediction with respect to reference samples in other reference pictures. Pictures may be referred to as frames, and reference pictures may be referred to as reference frames.

SUMMARY

In general, this disclosure describes techniques for deriving a coding system operational configuration. A video coding standard may have a variety of available "profiles," that is, sets of coding tools. A sub-profile may include a subset of the set of coding tools in the profile. This disclosure describes techniques for coding data (e.g., a value for a profile indicator or "profile_idc") representing which tools within the available set of tools of a profile are enabled and/or disabled. In this manner, data related to the set of coding tools that are disabled for a bitstream need not be coded, thereby improving video coder performance and reducing a bitrate of the bitstream.

In one example, a method of coding video data includes coding a value for a profile indicator syntax element in a bitstream including video data, the value for the profile indicator representing a class of a profile to which the bitstream conforms; coding one or more values representing one or more coding-tool-specific constraints, separate from the profile indicator syntax element, each of the coding-tool-specific constraints indicating whether coding tools corresponding to the coding-tool-specific constraints can be enabled for at least a subset of the bitstream; and coding the video data according to the coding-tool-specific constraints and the class of the profile.

In another example, a device for coding video data includes a memory configured to store video data; and one or more processors implemented in circuitry and configured to: code a value for a profile indicator syntax element in a bitstream including video data, the value for the profile indicator representing a class of a profile to which the bitstream conforms; code one or more values representing one or more coding-tool-specific constraints, separate from the profile indicator syntax element, each of the coding-tool-specific constraints indicating whether coding tools corresponding to the coding-tool-specific constraints can be enabled for at least a subset of the bitstream; and code the video data according to the coding-tool-specific constraints and the class of the profile.

In another example, a computer-readable storage medium has stored thereon instructions that cause a processor to code a value for a profile indicator syntax element in a bitstream including video data, the value for the profile indicator representing a class of a profile to which the bitstream conforms; code one or more values representing one or more coding-tool-specific constraints, separate from the profile indicator syntax element, each of the coding-tool-specific constraints indicating whether coding tools corresponding to the coding-tool-specific constraints can be enabled for at least a subset of the bitstream; and code the video data according to the coding-tool-specific constraints and the class of the profile.

In another example, a device for coding video data includes means for coding a value for a profile indicator syntax element in a bitstream including video data, the value for the profile indicator representing a class of a profile to which the bitstream conforms; means for coding one or more values representing one or more coding-tool-specific constraints, separate from the profile indicator syntax element, each of the coding-tool-specific constraints indicating whether coding tools corresponding to the coding-tool-specific constraints can be enabled for at least a subset of the bitstream; and means for coding the video data according to the coding-tool-specific constraints and the class of the profile.

The details of one or more examples are set forth in the accompanying drawings and the description below. Other features, objects, and advantages will be apparent from the description, drawings, and claims.

DETAILED DESCRIPTION

Figure 1:
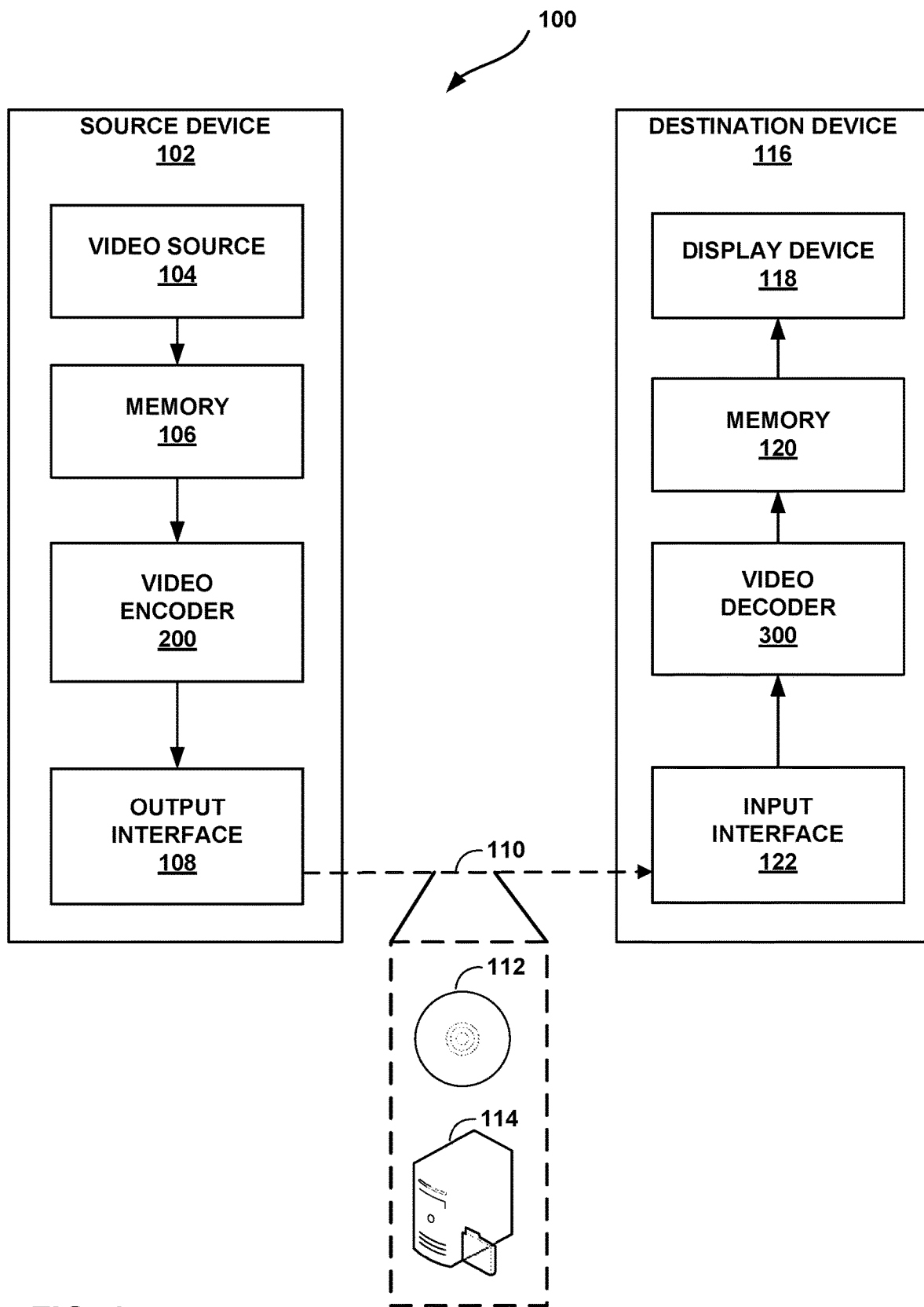
FIG. 1 is a block diagram illustrating an example video encoding and decoding system that may perform the techniques of this disclosure.

Conventionally, standardized video coding designs, e.g., H.264/AVC or H.265/HEVC, are defined as a family of standards, including a number of different operational configurations (set of enabled tools) called "profiles." A specific decoder decodes at least one, but not necessarily, all profiles. The decoder specification describes which profiles can be decoded. For example, a decoder that conforms to a particular profile is capable of decoding all bitstreams that conform to that profile. The conditions for conformance of a decoder and a bitstream to a profile are specified in the codec specification.

A video encoder may signal a profile identification in a coded bitstream using a value for a syntax element, e.g., profile_idc syntax element. Example syntax and semantics are shown below:

| | Descriptor |
|---|---|
| seq_parameter_set_rbsp( ) { | |
|     sps_seq_parameter_set_id | ue(v) |
|     profile_idc | u(7) | profile_idc indicates a profile to which the CVS conforms as specified in Annex A of the ITU-T H.265 (HEVC) standard ("HEVC") and/or VVC. Bitstreams shall not contain values of profile_idc other than those specified in Annex A of HEVC and/or VVC. Other values of profile_idc are reserved for future use by ISO/IEC.

Capabilities of video decoders conforming to certain video coding designs (standarized by a standards development organization (SDO)) may be specified in terms of the ability to decode video streams conforming to the constraints of profiles (tiers and levels) specified in the video coding specification. Specific values of syntax elements profile_idc (tiers or levels) are typically specified in this specification text. Other values of profile_idc (and level idc) may be reserved for future use by ISO/IEC.

Decoders complying with a certain specification are typically recommended not to infer that a reserved value of profile_idc between the values specified in the standard document indicates intermediate capabilities between the specified profiles, as there are no restrictions on the method to be chosen by ISO/IEC for the use of such future reserved values. However, decoders may infer that a reserved value of level idc associated with a particular value of tier_flag between the values specified in the standard document indicates intermediate capabilities between the specified levels of the tier.

The latter restriction is imposed to clearly specify compliance of the decoder to the specific operational configuration. In such approach, every new operational configuration (new profile), if identified as necessary, would be required to be published by the SDO that issued that particular specification, and new profile_idc value would need to be reserved, which is a relatively long process.

To avoid possible delay, industrial (application) SDOs (e.g., DVB or ATSC) may define their own sub-profile (sub-set of certain profile) that is required to be supported by decoder operations in applications. However, this approach may lead to market fragmentation, since there may be various SDOs defining different sub-profiles, and hardware/software suppliers providing encoder/decoder would need to follow these SDOs and implement additional signalling logic to identify applicational sub-profiles outside of the video coding specification logic.

This disclosure describes techniques for specifying coding tools that a video decoder must support in order to successfully decode a video bitstream. In this manner, a client device including the video decoder may determine which of a variety of sets of video bitstreams to retrieve. In particular, the client device may select a video bitstream that is encoded using coding tools that are implemented by the video decoder of the client device. If multiple such video bitstreams are available, the client device may evaluate other criteria for selection as well, such as bitrate, available bandwidth for retrieving the video bitstream, quality, format (e.g., whether the video bitstream supports a single viewpoint, three-dimensional video data, multi-view video data, 360-degree video, spatial resolution, or the like), or other such characteristics.

In this manner, the techniques of this disclosure allow a client device to determine whether a video bitstream can be decoded by a video decoder of the client device prior to retrieving a full set of video data of the video bitstream. In this manner, these techniques may improve the field of video coding, because these techniques allow the client device to quickly identify a decodable video bitstream, while also avoiding wasted bandwidth that may otherwise occur by retrieving a video bitstream that the video decoder cannot properly decode. Furthermore, these techniques may improve latency associated with retrieval of video data, in that the client device can quickly identify a video bitstream that can be properly decoded by a video decoder of the client device.

FIG. 1 is a block diagram illustrating an example video encoding and decoding system 100 that may perform the techniques of this disclosure. The techniques of this disclosure are generally directed to coding (encoding and/or decoding) video data. In general, video data includes any data for processing a video. Thus, video data may include raw, uncoded video, encoded video, decoded (e.g., reconstructed) video, and video metadata, such as signaling data.

As shown in FIG. 1, system 100 includes a source device 102 that provides encoded video data to be decoded and displayed by a destination device 116, in this example. In particular, source device 102 provides the video data to destination device 116 via a computer-readable medium 110. Source device 102 and destination device 116 may comprise any of a wide range of devices, including desktop computers, notebook (i.e., laptop) computers, tablet computers, set-top boxes, telephone handsets such smartphones, televisions, cameras, display devices, digital media players, video gaming consoles, video streaming device, or the like. In some cases, source device 102 and destination device 116 may be equipped for wireless communication, and thus may be referred to as wireless communication devices.

In the example of FIG. 1, source device 102 includes video source 104, memory 106, video encoder 200, and output interface 108. Destination device 116 includes input interface 122, video decoder 300, memory 120, and display device 118. In accordance with this disclosure, video encoder 200 of source device 102 and video decoder 300 of destination device 116 may be configured to apply the techniques for deriving (e.g., coding data representing) a coding system operational configuration. Thus, source device 102 represents an example of a video encoding device, while destination device 116 represents an example of a video decoding device. In other examples, a source device and a destination device may include other components or arrangements. For example, source device 102 may receive video data from an external video source, such as an external camera. Likewise, destination device 116 may interface with an external display device, rather than including an integrated display device.

System 100 as shown in FIG. 1 is merely one example. In general, any digital video encoding and/or decoding device may perform techniques for deriving (e.g., coding data representing) a coding system operational configuration. Source device 102 and destination device 116 are merely examples of such coding devices in which source device 102 generates coded video data for transmission to destination device 116. This disclosure refers to a "coding" device as a device that performs coding (encoding and/or decoding) of data. Thus, video encoder 200 and video decoder 300 represent examples of coding devices, in particular, a video encoder and a video decoder, respectively. In some examples, devices 102, 116 may operate in a substantially symmetrical manner such that each of devices 102, 116 include video encoding and decoding components. Hence, system 100 may support one-way or two-way video transmission between video devices 102, 116, e.g., for video streaming, video playback, video broadcasting, or video telephony.

In general, video source 104 represents a source of video data (i.e., raw, uncoded video data) and provides a sequential series of pictures (also referred to as "frames") of the video data to video encoder 200, which encodes data for the pictures. Video source 104 of source device 102 may include a video capture device, such as a video camera, a video archive containing previously captured raw video, and/or a video feed interface to receive video from a video content provider. As a further alternative, video source 104 may generate computer graphics-based data as the source video, or a combination of live video, archived video, and computer-generated video. In each case, video encoder 200 encodes the captured, pre-captured, or computer-generated video data. Video encoder 200 may rearrange the pictures from the received order (sometimes referred to as "display order") into a coding order for coding. Video encoder 200 may generate a bitstream including encoded video data. Source device 102 may then output the encoded video data via output interface 108 onto computer-readable medium 110 for reception and/or retrieval by, e.g., input interface 122 of destination device 116.

Memory 106 of source device 102 and memory 120 of destination device 116 represent general purpose memories. In some examples, memories 106, 120 may store raw video data, e.g., raw video from video source 104 and raw, decoded video data from video decoder 300. Additionally or alternatively, memories 106, 120 may store software instructions executable by, e.g., video encoder 200 and video decoder 300, respectively. Although shown separately from video encoder 200 and video decoder 300 in this example, it should be understood that video encoder 200 and video decoder 300 may also include internal memories for functionally similar or equivalent purposes. Furthermore, memories 106, 120 may store encoded video data, e.g., output from video encoder 200 and input to video decoder 300. In some examples, portions of memories 106, 120 may be allocated as one or more video buffers, e.g., to store raw, decoded, and/or encoded video data.

Computer-readable medium 110 may represent any type of medium or device capable of transporting the encoded video data from source device 102 to destination device 116. In one example, computer-readable medium 110 represents a communication medium to enable source device 102 to transmit encoded video data directly to destination device 116 in real-time, e.g., via a radio frequency network or computer-based network. Output interface 108 may modulate a transmission signal including the encoded video data, and input interface 122 may demodulate the received transmission signal, according to a communication standard, such as a wireless communication protocol. The communication medium may comprise any wireless or wired communication medium, such as a radio frequency (RF) spectrum or one or more physical transmission lines. The communication medium may form part of a packet-based network, such as a local area network, a wide-area network, or a global network such as the Internet. The communication medium may include routers, switches, base stations, or any other equipment that may be useful to facilitate communication from source device 102 to destination device 116.

In some examples, source device 102 may output encoded data from output interface 108 to storage device 112. Similarly, destination device 116 may access encoded data from storage device 112 via input interface 122. Storage device 112 may include any of a variety of distributed or locally accessed data storage media such as a hard drive, Blu-ray discs, DVDs, CD-ROMs, flash memory, volatile or non-volatile memory, or any other suitable digital storage media for storing encoded video data.

In some examples, source device 102 may output encoded video data to file server 114 or another intermediate storage device that may store the encoded video data generated by source device 102. Destination device 116 may access stored video data from file server 114 via streaming or download.

File server 114 may be any type of server device capable of storing encoded video data and transmitting that encoded video data to the destination device 116. File server 114 may represent a web server (e.g., for a website), a server configured to provide a file transfer protocol service (such as File Transfer Protocol (FTP) or File Delivery over Unidirectional Transport (FLUTE) protocol), a content delivery network (CDN) device, a hypertext transfer protocol (HTTP) server, a Multimedia Broadcast Multicast Service (MBMS) or Enhanced MBMS (eMBMS) server, and/or a network attached storage (NAS) device. File server 114 may, additionally or alternatively, implement one or more HTTP streaming protocols, such as Dynamic Adaptive Streaming over HTTP (DASH), HTTP Live Streaming (HLS), Real Time Streaming Protocol (RTSP), HTTP Dynamic Streaming, or the like.

Destination device 116 may access encoded video data from file server 114 through any standard data connection, including an Internet connection. This may include a wireless channel (e.g., a Wi-Fi connection), a wired connection (e.g., digital subscriber line (DSL), cable modem, etc.), or a combination of both that is suitable for accessing encoded video data stored on file server 114. Input interface 122 may be configured to operate according to any one or more of the various protocols discussed above for retrieving or receiving media data from file server 114, or other such protocols for retrieving media data.

Output interface 108 and input interface 122 may represent wireless transmitters/receivers, modems, wired networking components (e.g., Ethernet cards), wireless communication components that operate according to any of a variety of IEEE 802.11 standards, or other physical components. In examples where output interface 108 and input interface 122 comprise wireless components, output interface 108 and input interface 122 may be configured to transfer data, such as encoded video data, according to a cellular communication standard, such as 4G, 4G-LTE (Long-Term Evolution), LTE Advanced, 5G, or the like. In some examples where output interface 108 comprises a wireless transmitter, output interface 108 and input interface 122 may be configured to transfer data, such as encoded video data, according to other wireless standards, such as an IEEE 802.11 specification, an IEEE 802.15 specification (e.g., ZigBee™), a Bluetooth™ standard, or the like. In some examples, source device 102 and/or destination device 116 may include respective system-on-a-chip (SoC) devices. For example, source device 102 may include an SoC device to perform the functionality attributed to video encoder 200 and/or output interface 108, and destination device 116 may include an SoC device to perform the functionality attributed to video decoder 300 and/or input interface 122.

The techniques of this disclosure may be applied to video coding in support of any of a variety of multimedia applications, such as over-the-air television broadcasts, cable television transmissions, satellite television transmissions, Internet streaming video transmissions, such as dynamic adaptive streaming over HTTP (DASH), digital video that is encoded onto a data storage medium, decoding of digital video stored on a data storage medium, or other applications.

Input interface 122 of destination device 116 receives an encoded video bitstream from computer-readable medium 110 (e.g., storage device 112, file server 114, or the like). The encoded video bitstream may include signaling information defined by video encoder 200, which is also used by video decoder 300, such as syntax elements having values that describe characteristics and/or processing of video blocks or other coded units (e.g., slices, pictures, groups of pictures, sequences, or the like). Display device 118 displays decoded pictures of the decoded video data to a user. Display device 118 may represent any of a variety of display devices such as a cathode ray tube (CRT), a liquid crystal display (LCD), a plasma display, an organic light emitting diode (OLED) display, or another type of display device.

Although not shown in FIG. 1, in some examples, video encoder 200 and video decoder 300 may each be integrated with an audio encoder and/or audio decoder, and may include appropriate MUX-DEMUX units, or other hardware and/or software, to handle multiplexed streams including both audio and video in a common data stream. If applicable, MUX-DEMUX units may conform to the ITU H.223 multiplexer protocol, or other protocols such as the user datagram protocol (UDP).

Video encoder 200 and video decoder 300 each may be implemented as any of a variety of suitable encoder and/or decoder circuitry, such as one or more microprocessors, digital signal processors (DSPs), application specific integrated circuits (ASICs), field programmable gate arrays (FPGAs), discrete logic, software, hardware, firmware or any combinations thereof. When the techniques are implemented partially in software, a device may store instructions for the software in a suitable, non-transitory computer-readable medium and execute the instructions in hardware using one or more processors to perform the techniques of this disclosure. Each of video encoder 200 and video decoder 300 may be included in one or more encoders or decoders, either of which may be integrated as part of a combined encoder/decoder (CODEC) in a respective device. A device including video encoder 200 and/or video decoder 300 may comprise an integrated circuit, a microprocessor, and/or a wireless communication device, such as a cellular telephone.

Video encoder 200 and video decoder 300 may operate according to a video coding standard, such as ITU-T H.265, also referred to as High Efficiency Video Coding (HEVC) or extensions thereto, such as the multi-view and/or scalable video coding extensions. Alternatively, video encoder 200 and video decoder 300 may operate according to other proprietary or industry standards, such as Versatile Video Coding (VVC). A recent draft of the VVC standard is described in Bross, et al. "Versatile Video Coding (Draft 5)," Joint Video Experts Team (WET) of ITU-T SG 16 WP 3 and ISO/IEC JTC 1/SC 29/WG 11, 14th Meeting: Geneva, CH, 19-27 Mar. 2019, JVET-N1001-v3 (hereinafter "VVC Draft 5"). The techniques of this disclosure, however, are not limited to any particular coding standard.

In general, video encoder 200 and video decoder 300 may perform block-based coding of pictures. The term "block" generally refers to a structure including data to be processed (e.g., encoded, decoded, or otherwise used in the encoding and/or decoding process). For example, a block may include a two-dimensional matrix of samples of luminance and/or chrominance data. In general, video encoder 200 and video decoder 300 may code video data represented in a YUV (e.g., Y, Cb, Cr) format. That is, rather than coding red, green, and blue (RGB) data for samples of a picture, video encoder 200 and video decoder 300 may code luminance and chrominance components, where the chrominance components may include both red hue and blue hue chrominance components. In some examples, video encoder 200 converts received RGB formatted data to a YUV representation prior to encoding, and video decoder 300 converts the YUV representation to the RGB format. Alternatively, pre- and post-processing units (not shown) may perform these conversions.

This disclosure may generally refer to coding (e.g., encoding and decoding) of pictures to include the process of encoding or decoding data of the picture. Similarly, this disclosure may refer to coding of blocks of a picture to include the process of encoding or decoding data for the blocks, e.g., prediction and/or residual coding. An encoded video bitstream generally includes a series of values for syntax elements representative of coding decisions (e.g., coding modes) and partitioning of pictures into blocks. Thus, references to coding a picture or a block should generally be understood as coding values for syntax elements forming the picture or block.

HEVC defines various blocks, including coding units (CUs), prediction units (PUs), and transform units (TUs). According to HEVC, a video coder (such as video encoder 200) partitions a coding tree unit (CTU) into CUs according to a quadtree structure. That is, the video coder partitions CTUs and CUs into four equal, non-overlapping squares, and each node of the quadtree has either zero or four child nodes. Nodes without child nodes may be referred to as "leaf nodes," and CUs of such leaf nodes may include one or more PUs and/or one or more TUs. The video coder may further partition PUs and TUs. For example, in HEVC, a residual quadtree (RQT) represents partitioning of TUs. In HEVC, PUs represent inter-prediction data, while TUs represent residual data. CUs that are intra-predicted include intra-prediction information, such as an intra-mode indication.

As another example, video encoder 200 and video decoder 300 may be configured to operate according to VVC. According to VVC, a video coder (such as video encoder 200) partitions a picture into a plurality of coding tree units (CTUs). Video encoder 200 may partition a CTU according to a tree structure, such as a quadtree-binary tree (QTBT) structure or Multi-Type Tree (MTT) structure. The QTBT structure removes the concepts of multiple partition types, such as the separation between CUs, PUs, and TUs of HEVC. A QTBT structure includes two levels: a first level partitioned according to quadtree partitioning, and a second level partitioned according to binary tree partitioning. A root node of the QTBT structure corresponds to a CTU. Leaf nodes of the binary trees correspond to coding units (CUs).

In an MTT partitioning structure, blocks may be partitioned using a quadtree (QT) partition, a binary tree (BT) partition, and one or more types of triple tree (TT) partitions. A triple tree partition is a partition where a block is split into three sub-blocks. In some examples, a triple tree partition divides a block into three sub-blocks without dividing the original block through the center. The partitioning types in MTT (e.g., QT, BT, and TT), may be symmetrical or asymmetrical.

In some examples, video encoder 200 and video decoder 300 may use a single QTBT or MTT structure to represent each of the luminance and chrominance components, while in other examples, video encoder 200 and video decoder 300 may use two or more QTBT or MTT structures, such as one QTBT/MTT structure for the luminance component and another QTBT/MTT structure for both chrominance components (or two QTBT/MTT structures for respective chrominance components).

Video encoder 200 and video decoder 300 may be configured to use quadtree partitioning per HEVC, QTBT partitioning, MTT partitioning, or other partitioning structures. For purposes of explanation, the description of the techniques of this disclosure is presented with respect to QTBT partitioning. However, it should be understood that the techniques of this disclosure may also be applied to video coders configured to use quadtree partitioning, or other types of partitioning as well.

This disclosure may use "N×N" and "N by N" interchangeably to refer to the sample dimensions of a block (such as a CU or other video block) in terms of vertical and horizontal dimensions, e.g., 16×16 samples or 16 by 16 samples. In general, a 16×16 CU will have 16 samples in a vertical direction (y=16) and 16 samples in a horizontal direction (x=16). Likewise, an N×N CU generally has N samples in a vertical direction and N samples in a horizontal direction, where N represents a nonnegative integer value. The samples in a CU may be arranged in rows and columns. Moreover, CUs need not necessarily have the same number of samples in the horizontal direction as in the vertical direction. For example, CUs may comprise N×M samples, where M is not necessarily equal to N.

Video encoder 200 encodes video data for CUs representing prediction and/or residual information, and other information. The prediction information indicates how the CU is to be predicted in order to form a prediction block for the CU. The residual information generally represents sample-by-sample differences between samples of the CU prior to encoding and the prediction block.

The blocks (e.g., CTUs or CUs) may be grouped in various ways in a picture. As one example, a brick may refer to a rectangular region of CTU rows within a particular tile in a picture. A tile may include a rectangular region of CTUs within a particular tile column and a particular tile row in a picture. A tile column may refer to a rectangular region of CTUs having a height equal to the height of the picture and a width specified by syntax elements (e.g., such as in a picture parameter set). A tile row may refer to a rectangular region of CTUs having a height specified by syntax elements (e.g., such as in a picture parameter set) and a width equal to the width of the picture.

In some examples, a tile may be partitioned into multiple bricks, each of which may include one or more CTU rows within the tile. A tile that is not partitioned into multiple bricks may also be referred to as a brick. A brick that is a true subset of a tile need not be referred to as a tile.

Bricks in a picture may also be arranged in a slice. A slice may include an integer number of bricks of a picture that may be exclusively contained in a single network abstraction layer (NAL) unit. In some examples, a slice includes either a number of complete tiles or only a consecutive sequence of complete bricks of one tile.

To predict a CU, video encoder 200 may generally form a prediction block for the CU through inter-prediction or intra-prediction. Inter-prediction generally refers to predicting the CU from data of a previously coded picture, whereas intra-prediction generally refers to predicting the CU from previously coded data of the same picture. To perform inter-prediction, video encoder 200 may generate the prediction block using one or more motion vectors. Video encoder 200 may generally perform a motion search to identify a reference block that closely matches the CU, e.g., in terms of differences between the CU and the reference block. Video encoder 200 may calculate a difference metric using a sum of absolute difference (SAD), sum of squared differences (SSD), mean absolute difference (MAD), mean squared differences (MSD), or other such difference calculations to determine whether a reference block closely matches the current CU. In some examples, video encoder 200 may predict the current CU using uni-directional prediction or bi-directional prediction.

Some examples of VVC also provide an affine motion compensation mode, which may be considered an inter-prediction mode. In affine motion compensation mode, video encoder 200 may determine two or more motion vectors that represent non-translational motion, such as zoom in or out, rotation, perspective motion, or other irregular motion types.

To perform intra-prediction, video encoder 200 may select an intra-prediction mode to generate the prediction block. Some examples of VVC provide sixty-seven intra-prediction modes, including various directional modes, as well as planar mode and DC mode. In general, video encoder 200 selects an intra-prediction mode that describes neighboring samples to a current block (e.g., a block of a CU) from which to predict samples of the current block. Such samples may generally be above, above and to the left, or to the left of the current block in the same picture as the current block, assuming video encoder 200 codes CTUs and CUs in raster scan order (left to right, top to bottom).

Video encoder 200 encodes data representing the prediction mode for a current block. For example, for inter-prediction modes, video encoder 200 may encode data representing which of the various available inter-prediction modes is used, as well as motion information for the corresponding mode. For uni-directional or bi-directional inter-prediction, for example, video encoder 200 may encode motion vectors using advanced motion vector prediction (AMVP) or merge mode. Video encoder 200 may use similar modes to encode motion vectors for affine motion compensation mode.

Following prediction, such as intra-prediction or inter-prediction of a block, video encoder 200 may calculate residual data for the block. The residual data, such as a residual block, represents sample by sample differences between the block and a prediction block for the block, formed using the corresponding prediction mode. Video encoder 200 may apply one or more transforms to the residual block, to produce transformed data in a transform domain instead of the sample domain. For example, video encoder 200 may apply a discrete cosine transform (DCT), an integer transform, a wavelet transform, or a conceptually similar transform to residual video data. Additionally, video encoder 200 may apply a secondary transform following the first transform, such as a mode-dependent non-separable secondary transform (MDNSST), a signal dependent transform, a Karhunen-Loeve transform (KLT), or the like. Video encoder 200 produces transform coefficients following application of the one or more transforms.

As noted above, following any transforms to produce transform coefficients, video encoder 200 may perform quantization of the transform coefficients. Quantization generally refers to a process in which transform coefficients are quantized to possibly reduce the amount of data used to represent the coefficients, providing further compression. By performing the quantization process, video encoder 200 may reduce the bit depth associated with some or all of the coefficients. For example, video encoder 200 may round an n-bit value down to an m-bit value during quantization, where n is greater than m. In some examples, to perform quantization, video encoder 200 may perform a bitwise right-shift of the value to be quantized.

Following quantization, video encoder 200 may scan the transform coefficients, producing a one-dimensional vector from the two-dimensional matrix including the quantized transform coefficients. The scan may be designed to place higher energy (and therefore lower frequency) coefficients at the front of the vector and to place lower energy (and therefore higher frequency) transform coefficients at the back of the vector. In some examples, video encoder 200 may utilize a predefined scan order to scan the quantized transform coefficients to produce a serialized vector, and then entropy encode the quantized transform coefficients of the vector. In other examples, video encoder 200 may perform an adaptive scan. After scanning the quantized transform coefficients to form the one-dimensional vector, video encoder 200 may entropy encode the one-dimensional vector, e.g., according to context-adaptive binary arithmetic coding (CABAC). Video encoder 200 may also entropy encode values for syntax elements describing metadata associated with the encoded video data for use by video decoder 300 in decoding the video data.

To perform CABAC, video encoder 200 may assign a context within a context model to a symbol to be transmitted. The context may relate to, for example, whether neighboring values of the symbol are zero-valued or not. The probability determination may be based on a context assigned to the symbol.

Video encoder 200 may further generate syntax data, such as block-based syntax data, picture-based syntax data, and sequence-based syntax data, to video decoder 300, e.g., in a picture header, a block header, a slice header, or other syntax data, such as a sequence parameter set (SPS), picture parameter set (PPS), or video parameter set (VPS). Video decoder 300 may likewise decode such syntax data to determine how to decode corresponding video data.

In this manner, video encoder 200 may generate a bitstream including encoded video data, e.g., syntax elements describing partitioning of a picture into blocks (e.g., CUs) and prediction and/or residual information for the blocks. Ultimately, video decoder 300 may receive the bitstream and decode the encoded video data.

In general, video decoder 300 performs a reciprocal process to that performed by video encoder 200 to decode the encoded video data of the bitstream. For example, video decoder 300 may decode values for syntax elements of the bitstream using CABAC in a manner substantially similar to, albeit reciprocal to, the CABAC encoding process of video encoder 200. The syntax elements may define partitioning information of a picture into CTUs, and partitioning of each CTU according to a corresponding partition structure, such as a QTBT structure, to define CUs of the CTU. The syntax elements may further define prediction and residual information for blocks (e.g., CUs) of video data.

The residual information may be represented by, for example, quantized transform coefficients. Video decoder 300 may inverse quantize and inverse transform the quantized transform coefficients of a block to reproduce a residual block for the block. Video decoder 300 uses a signaled prediction mode (intra- or inter-prediction) and related prediction information (e.g., motion information for inter-prediction) to form a prediction block for the block. Video decoder 300 may then combine the prediction block and the residual block (on a sample-by-sample basis) to reproduce the original block. Video decoder 300 may perform additional processing, such as performing a deblocking process to reduce visual artifacts along boundaries of the block.

In accordance with the techniques of this disclosure, video encoder 200 and video decoder 300 may code data representing a coding system operational configuration, e.g., a value for a profile indicator (profile_idc). In particular, the profile_idc may have an associated maximum value within a range of possible values, and video encoder 200 and video decoder 300 may be configured to code a value within the range to represent which of a set of coding tools is enabled and disabled for a particular bitstream. That is, video encoder 200 and video decoder 300 may be configured with a defined operational configuration for a range of profile_idc values. Sub-profiles to a corresponding profile (e.g., profile A) may be identified by a range of allowed sub-profiles. For example, a profile can be defined by a range of values {1, 255}, where a full operational scope (set of tools) is identified by value 255, and values {1, 254} would specify a certain sub-profile, implying that a restricted scope of tools from the profile are enabled (e.g., marking that some tools are disabled and, thus, not used for the corresponding bitstream).

An example is shown below:

|  | Descriptor |
|---|---|
| seq_parameter_set_rbsp( ) { |  |
|   sps_seq_parameter_set_id | ue(v) |
|   profile_idc | u(8) |

In some examples, video encoder 200 and video decoder 300 may be configured with a derivation logic that identifies parameters of a sub-profile associated with a certain profile_idc value being in the given range allowed for a profile.

For example, assume that a coding design includes N number of tools, where each of the tools is identified by a bit in the profile_idc value. For example, for N=8, the following interpretation of profile_idc is possible:

Profile_idc=255 (in binary representation 11111111) specifies that all 8 tools (Tools {A, H}) are enabled.

Profile_idc=1 (00000001) specify that only tool H is enabled.

Profile_idc=129 (10000001) specify that only tools A and H are enabled.

More generally, in this example, the profile_idc value is a binary value, each bit corresponding to one coding tool. Each bit has a value representing whether the corresponding coding tool is enabled or disabled. That is, when N tools are associated with each bit of the 8-bit representation of profile_idc, the value of 1 in the k-th bit of profile_idc may specify that the profile may be associated with the tool, which is associated with the k-th bit, is enabled.

Alternatively, when N tools are associated with each bit of the 8-bit representation of profile_idc, the value of 0 in the k-th bit of profile_idc may specify that the profile may be associated with the tool, which is associated with the k-th bit, is disabled.

The enabling or disabling of one or more tools may be specified by one or more techniques as discussed above.

In some examples, coding tools can be combined and identified by a single bit in a profile_idc value, e.g., for coding designs including N=8 tools, profile_idc can be expressed by a 4 bit value, where tools are paired for identification purposes. Thus, for example:

Profile_idc=15 (1111) specifies that all 8 tools are enabled.

Profile_idc=8 (1000) specifies that only tools A and B are enabled.

Examples of the various coding tools that may be enabled or disabled include use of binary-ternary trees (BTTs), split unit coding order (SUCO), adaptive motion vector resolution (AMVR), merge motion vector difference (MMVD), affine mode, decoder-side motion vector derivation (DMVR), adaptive loop filtering (ALF), advanced motion vector prediction (AMVP), intra-block copy (IBC), and signaling reference picture list (RPL) data in a picture header (PH) or slice header (SH).

In some examples, a k-th bit in the K-bit representation of the profile_idc may be associated with one or more tools, the association of the one or more tools specified for the k-th bit for each k in the range of 0 to K−1, inclusive.

In some examples, one tool may be associated with more than one bit; constraints may be imposed to ensure that the flags do not specify contradictory specifications for the flag (i.e., it is disallowed that one flag indicates that a particular tool is enabled, and another flag indicates that the particular tool is disabled).

For a tool, one or more tools may be specified to be associated tools, such that when the tool is enabled, the one or more associated tools may also be considered to be enabled. In some examples, for a tool, one or more tools may be specified to be associated tools such that when the tool is disabled, the one or more associated tools may also be considered to be disabled. In some examples, the tool may be considered a parent tool (independent tool) and one or more of its associated tools may be considered dependent tools. The profile_idc may be specified to only apply to one or more independent tools using one or more of the techniques of this disclosure.

Video decoder 300 may be implemented to be compliant to support all tools defining a highest possible profile_idc. However, in this implementation, video decoder 300 may reject decoding bitstreams with profile_idc within a given sub-range, meaning that video decoder 300 may be configured to reject decoding of the bitstreams including certain coding tool combinations.

In some examples, certain constraints can be further imposed on other syntax values of the bitstream. For example, in addition to profile_idc value, tools could have other enabling mechanisms being signaled, e.g., enabling flag in sequence parameter set (SPS), picture parameter set (PPS), slice/tiles or other level of bitstream structure. In some examples, it may be stated that, depending on profile_idc value, syntax elements defining operation of certain tools shall be set to a certain value, e.g.:

For Profile_idc=1 (00000001) specify that only tool H is enabled, thus:

All complying bitstream shall comply with the following constraints:

sps_enable_toolA set to 0
sps_enable_toolB set to 0
sps_enable_toolC set to 0
sps_enable_toolD set to 0
sps_enable_toolE set to 0
sps_enable_toolF set to 0
sps_enable_toolG set to 0
sps_enable_toolH set to 1

In some examples, video encoder 200 and video decoder 300 may include derivation logic to define sub-profiles, e.g., using binary masks with binary multiplication and/or using bitwise shifts. In some examples, the derivation logic for certain profiles can apply offsets (e.g., increments or decrements by a certain number), specifying the particular profile range, e.g., 128-256, with an offset being equal to 128.

In some examples, profile IDC can have a binary (or exponential) structure specifying enabled tools/set of tools in a dyadic tree way.

In some examples, a profile indication may belong to a set of possible values specified in the video standard specification. For each possible value, a set of constraints and properties may be defined. For each possible value C, a set of associated alternate values (e.g., sub-profile) may be specified, which specifies an alternate profile indication for a bitstream. In some cases, video decoder 300, when compliant to profile C, may also be able to decode all bitstreams that are compliant to any of the associated alternate values. The conditions associated with any of the alternate values may include the conditions associated with value C, and one or more additional constraints (e.g., if C indicates all tools are enabled, an alternate value D may indicate that additionally tool H is disabled). The possible value, and alternate value(s) may be specified by one or more techniques, such as a range of values, a value followed by a prefix, a string, etc.

In some examples, an explicit profile_idc may not be specified, and video encoder 200 and video decoder 300 may derive a value for profile_idc from a profile_idc value (e.g., associated with a possible value C) and a set of syntax elements (e.g., associated with constraint flags for each tool) to identify the profile/sub-profile that the bitstream belongs to. For each decoder that is conformant to a profile P, the decoder is also capable of decoding all bitstreams conformant to sub-profiles of P in addition to decoding bitstreams conformant to profile P. For each bitstream that is conformant to a sub-profile S of profile P, any decoder that is conformant to sub-profile S is capable of decoding the bitstream; any decoder that is conformant to P is capable of decoding the bitstream.

In some cases, sub-profiles may be considered hierarchical. For example, if P is a profile, and S is a sub-profile of P, S1 may be a sub-profile of S (also, S1 is a sub-profile of P) obtained by further restrictions or conditions on top of conditions/restrictions for S.

One or more of the techniques discussed above may apply to profiles or sub-profiles (including hierarchical) or related concepts.

In some examples, additional profile information may be included in an SEI message or other parts of the bitstream. The profile information may be considered to override the profile indication originally in the bitstream.

In some examples, a profile indication override may also be accompanied with one or more alternate processes. For example, the profile indication in bitstream may indicate a tool T may be used, and profile override may indicate a tool that is used to code the bitstream may no longer be used. In addition, an additional set of tools, or additional instructions, or additional reference, or additional algorithm may be referenced to be used instead. The use of such alternatives may not necessarily lead to the original output, but indication of specification for the alternative output may also be specified and indicated/signaled in the bitstream through signalling in-bitstream (SEI messages, etc.) or other means.

In some examples, a profile indicator (profile_idc) may not be used to indicate tool-specific enabling/disabling indications as disclosed in some of the other aspects above. Instead, profile_idc may be used to specify certain classes of profiles (e.g., Base, Main, Extended, Constrained etc.)

Video encoder 200 and video decoder 300 may code data representing an indication (such as a flag or other syntax element) of whether coding-tool-specific profile constraints as disclosed in some of the techniques above are indicated. For example, video encoder 200 and video decoder 300 may code a constrained_tool_indication_flag in the bitstream to indicate that coding-tool-specific enabling/disabling indications may be signaled. In some examples, this indication may be a pre-defined value for some values of profile_idc. For example, for a main profile, the indication may be such that constrained_tool_indication_flag is equal to 0 and that no constraints are applied on the tools; this may mean that all the tools may be enabled for this bitstream. In some examples, this indication may be zero for a baseline profile indicating that all tools are disabled.

When coding-tool-specific profile constraints may be indicated according to the syntax elements discussed above, video encoder 200 and video decoder 300 may code a value for a syntax element (e.g., constrained_tool_val) to indicate coding-tool-specific constraints. For a coding tool, video encoder 200 and video decoder 300 may derive an indication for constraints for the tool from constrained_tool_val. For example, an n-th bit of constrained_tool_val may be indicated whether the tool is enabled or disabled in the bitstream or the profile.

In some examples, enabling or disabling a tool class may be derived from the profile class value (which in turn may be derived from the profile_idc value); within each profile class, a further indication may be provided for tool-specific information. For example, an n-th bit of profile_idc may be used to indicate whether a set of tools (tool class) is enabled or disabled. The constrainted_tool_val may be used to derive the tool-specific enabling/disabling information. In some examples, the value range or allowed values of constrained_tool_val may be restricted so that only the indication for the tools that belong to the enabled tool classes are included.

For example, there may be 3 tool classes—Classes A, B and C—and each tool class has four tools each (indicated by four bits each). When all three classes are enabled, constrained_tool_val may contain 12 bits (four bits for each class of 3 available classes) and the tool-specific enabling/disabling may be derived from techniques described above. When only two classes are enabled, e.g., Classes A and C, only 8 bits may be used to indicate constrained_tool_val, where the first four bits may indicate tools in Class A and remaining four may indicate tools in Class C. Tools not specified in constrained_tool_val may be inferred to be disabled (or in some alternatives, enabled).

Video encoder 200 and video decoder 300 may also infer this information from the enabling/disabling of tool classes. The classes of tools may be ordered in a predefined manner. The order in which tools are indicated in constrained_tool_val may be dependent on the order of the classes of tools. The number of bits or range of value of constrained_tool_val may be dependent on the number of tool classes enabled/disabled, and which particular tool class(es) is (are) enabled. When dependencies may exist between two tools, it may be required that when one of the tools is indicated to be enabled, the other tool should also be enabled. This may also extend to profile classes or tool classes.

When tool-specific enabling/disabling information is specified, ToolVar may be the variable indicating this information. ToolVar could be defined/derived from profile_idc, constrained_tool_val, or other syntax elements (in some examples, ToolVar may be equal to profile_idc or constrained_tool_val, or in some examples, only some bits of profile_idc or constrained_tool_Val may be used to derive ToolVar). Conformance of bitstreams and decoders to a particular profile, or a particular profile with a particular value of ToolVar, may be conditioned on the value of profile_idc and ToolVar. An example of decoder conformance may be as follows:

Decoders conforming to the Main profile with ToolVar equal to Pldc_Dec at a specific level (identified by a specific value of level idc) shall be capable of decoding all bitstreams for which all of the following conditions apply: The bitstream is indicated to conform to the Main profile with ToolVar equal to Pldc_Bit, and Pldc_Dec|Pldc_Bit is equal to Pldc_Dec. The bitstream is indicated to conform to a level that is lower than or equal to the specified level.

Alternatively, the conformance may be defined as follows: Decoders conforming to the Main profile with ToolVar equal to Pldc_Dec at a specific level (identified by a specific value of level idc) shall be capable of decoding all bitstreams for which all of the following conditions apply: The bitstream is indicated to conform to the Main profile with ToolVar equal to Pldc_Bit, and Pldc_Dec & Pldc_Bit is equal to Pldc_Bit. The bitstream is indicated to conform to a level that is lower than or equal to the specified level.

One example of syntax for a sequence parameter set (SPS) raw byte sequence payload (RBSP) consistent with the techniques of this disclosure is shown below in Table 1:

TABLE 1

|  | Descriptor |
|---|---|
| seq_parameter_set_rbsp( ) { |  |
|   sps_seq_parameter_set_id | ue(v) |
|   profile_idc | u(8) |
|   level_idc | u(8) |
|   toolset_idc | u(32) |

Semantics for the "toolset_idc" syntax element shown in Table 1 may be defined as follows:

toolset_idc indicates set of constraints to which the CVS conforms as specified in Annex A of HEVC and/or VVC. Bitstreams shall not contain values of toolset_idc other than those specified in Annex A. Other values of toolset_idc are reserved for future use by ISO/IEC.

Furthermore, video encoder 200 and video decoder 300 may conform to VVC as discussed above. VVC may recite the following as Annex A, indicated above, consistent with the techniques of this disclosure:

Profiles, Levels and Toolsets (This annex forms an integral part of this International Standard.)

A.1 Overview of Profiles, Levels and Toolsets

Profiles, levels and toolsets specify restrictions on the bitstreams and hence limits on the capabilities needed to decode the bitstreams. Profiles, levels and toolsets may also be used to indicate interoperability points between individual decoder implementations.

NOTE 1—This document does not include individually selectable "options" at the decoder, as this would increase interoperability difficulties.

Each profile specifies a subset of algorithmic features and limits that shall be supported by all decoders conforming to that profile.

NOTE 2—Encoders are not required to make use of any particular subset of features supported in a profile.

Each level specifies a set of limits on the values that may be taken by the syntax elements of this document. The same set of level definitions is used with all profiles, but individual implementations may support a different level for each supported profile. For any given profile, a level generally corresponds to a particular decoder processing load and memory capability.

The profiles that are specified in clause A.3 are also referred to as the profiles specified in Annex A.

A.1.1 Main Profile

Conformance of a bitstream to the Main profile is indicated by profile_idc equal to 1.

Bitstreams conforming to the Main profile shall obey the following constraints:

Syntax element toolset_idc shall be in the range from 1 to x1FFFFF, inclusive.

Tools flag values in active SPSs shall conform to the constraints specified in Table A.9-76.

Active SPSs shall have chroma_format_idc equal to 0 or 1 only.

Active SPSs shall have bit_depth_luma_minus8 equal to 2 only.

Active SPSs shall have bit_depth_chroma_minus8 equal to 2 only.

The level constraints specified for the Main profile in clause A.4 shall be fulfilled.

Decoders conforming to the Main profile with toolset_idc equal to TIdc_dec (in range from 1 to x1FFFFF inclusive) at a specific level (identified by a specific value of level_idc) shall be capable of decoding all bitstreams for which all of the following conditions apply:

The bitstream is indicated to conform to the Main profile with toolset_idc equal to TIdc_Bit, and TIdc_Dec-|TIdc_Bit is equal to TIdc_Dec.

The bitstream is indicated to conform to a level that is lower than or equal to the specified level.

A.2 Toolsets

Bitstreams conforming to the Main Profile shall obey the constraints specified in Table A.1 for the SPS flag values:

TABLE A.9-76.5

Conformance requirement of tool flag values in SPS

| toolset_idc binIdx | SPS tool flag | Conformance requirement |
|---|---|---|
| 0 | sps_btt_flag | sps_btt_flag <= toolset_idc & 0x1 |
| 1 | sps_suco_flag | sps_suco_flag <= toolset_idc & 0x2 |
| 2 | sps_amvr_flag | sps_amvr_flag <= toolset_idc & 0x4 |
| 3 | sps_mmvd_flag | sps_mmvd_flag <= toolset_idc & 0x8 |
| 4 | sps_affine_flag | sps_affine_flag <= toolset_idc & 0x10 |
| 5 | sps_dmvr_flag | sps_dmvr_flag <= toolset_idc & 0x20 |
| 6 | sps_alf_flag | sps_alf_flag <= toolset_idc & 0x40 |
| 7 | sps_admvp_flag | sps_admvp_flag <= toolset_idc & 0x80 |
| 8 | sps_eipd_flag | sps_eipd_flag <= toolset_idc & 0x100 |
| 9 | sps_adcc_flag | sps_adcc_flag <= toolset_idc & 0x200 |
| 10 | sps_amis_flag | sps_amis_flag <= toolset_idc & 0x400 |
| 11 | sps_ibc_flag | sps_ibc_flag <= toolset_idc & 0x800 |
| 12 | sps_iqt_flag | sps_iqt_flag <= toolset_idc & 0x1000 |
| 13 | sps_htdf_flag | sps_htdf_flag <= toolset_idc & 0x2000 |
| 14 | sps_addb_flag | sps_addb_flag <= toolset_idc & 0x4000 |
| 15 | sps_cm_init_flag | sps_cm_init_flag <= toolset_idc & 0x8000 |
| 16 | sps_ats_flag | sps_ats_flag <= toolset_idc & 0x10000 |
| 17 | sps_rpl_flag | sps_rpl_flag <= toolset_idc & 0x20000 |
| 18 | sps_pocs_flag | sps_pocs_flag <= toolset_idc & 0x40000 |

This disclosure may generally refer to "signaling" certain information, such as syntax elements. The term "signaling" may generally refer to the communication of values for syntax elements and/or other data used to decode encoded video data. That is, video encoder 200 may signal values for syntax elements in the bitstream, and video decoder 300 may parse the bitstream to extract the signaled values. In general, signaling refers to generating a value in the bitstream, although it should be understood that video decoder 300 would also parse the bitstream to extract and interpret the signaled values. As noted above, source device 102 may transport the bitstream to destination device 116 substantially in real time, or not in real time, such as might occur when storing syntax elements to storage device 112 for later retrieval by destination device 116.

Figure 2A:
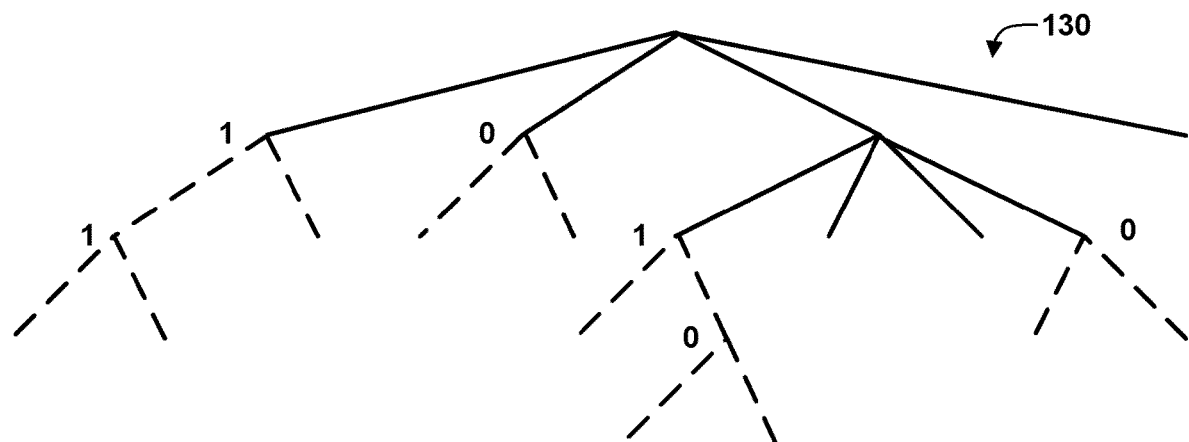
FIGS. 2A and 2B are conceptual diagrams illustrating an example quadtree binary tree (QTBT) structure, and a corresponding coding tree unit (CTU).
Figure 2B:
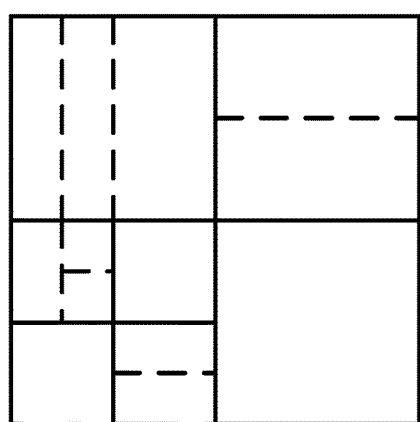

FIGS. 2A and 2B are conceptual diagram illustrating an example quadtree binary tree (QTBT) structure 130, and a corresponding coding tree unit (CTU) 132. The solid lines represent quadtree splitting, and dotted lines indicate binary tree splitting. In each split (i.e., non-leaf) node of the binary tree, one flag is signaled to indicate which splitting type (i.e., horizontal or vertical) is used, where 0 indicates horizontal splitting and 1 indicates vertical splitting in this example. For the quadtree splitting, there is no need to indicate the splitting type, since quadtree nodes split a block horizontally and vertically into 4 sub-blocks with equal size. Accordingly, video encoder 200 may encode, and video decoder 300 may decode, syntax elements (such as splitting information) for a region tree level of QTBT structure 130 (i.e., the solid lines) and syntax elements (such as splitting information) for a prediction tree level of QTBT structure 130 (i.e., the dashed lines). Video encoder 200 may encode, and video decoder 300 may decode, video data, such as prediction and transform data, for CUs represented by terminal leaf nodes of QTBT structure 130.

In general, CTU 132 of FIG. 2B may be associated with parameters defining sizes of blocks corresponding to nodes of QTBT structure 130 at the first and second levels. These parameters may include a CTU size (representing a size of CTU 132 in samples), a minimum quadtree size (MinQTSize, representing a minimum allowed quadtree leaf node size), a maximum binary tree size (MaxBTSize, representing a maximum allowed binary tree root node size), a maximum binary tree depth (MaxBTDepth, representing a maximum allowed binary tree depth), and a minimum binary tree size (MinBTSize, representing the minimum allowed binary tree leaf node size).

The root node of a QTBT structure corresponding to a CTU may have four child nodes at the first level of the QTBT structure, each of which may be partitioned according to quadtree partitioning. That is, nodes of the first level are either leaf nodes (having no child nodes) or have four child nodes. The example of QTBT structure 130 represents such nodes as including the parent node and child nodes having solid lines for branches. If nodes of the first level are not larger than the maximum allowed binary tree root node size (MaxBTSize), they can be further partitioned by respective binary trees. The binary tree splitting of one node can be iterated until the nodes resulting from the split reach the minimum allowed binary tree leaf node size (MinBTSize) or the maximum allowed binary tree depth (MaxBTDepth). The example of QTBT structure 130 represents such nodes as having dashed lines for branches. The binary tree leaf node is referred to as a coding unit (CU), which is used for prediction (e.g., intra-picture or inter-picture prediction) and transform, without any further partitioning. As discussed above, CUs may also be referred to as "video blocks" or "blocks."

In one example of the QTBT partitioning structure, the CTU size is set as 128×128 (luma samples and two corresponding 64×64 chroma samples), the MinQTSize is set as 16×16, the MaxBTSize is set as 64×64, the MinBTSize (for both width and height) is set as 4, and the MaxBTDepth is set as 4. The quadtree partitioning is applied to the CTU first to generate quad-tree leaf nodes. The quadtree leaf nodes may have a size from 16×16 (i.e., the MinQTSize) to 128×128 (i.e., the CTU size). If the leaf quadtree node is 128×128, it will not be further split by the binary tree, since the size exceeds the MaxBTSize (i.e., 64×64, in this example). Otherwise, the leaf quadtree node will be further partitioned by the binary tree. Therefore, the quadtree leaf node is also the root node for the binary tree and has the binary tree depth as 0. When the binary tree depth reaches MaxBTDepth (4, in this example), no further splitting is permitted. When the binary tree node has width equal to MinBTSize (4, in this example), it implies no further horizontal splitting is permitted. Similarly, a binary tree node having a height equal to MinBTSize implies no further vertical splitting is permitted for that binary tree node. As noted above, leaf nodes of the binary tree are referred to as CUs, and are further processed according to prediction and transform without further partitioning.

Figure 3:
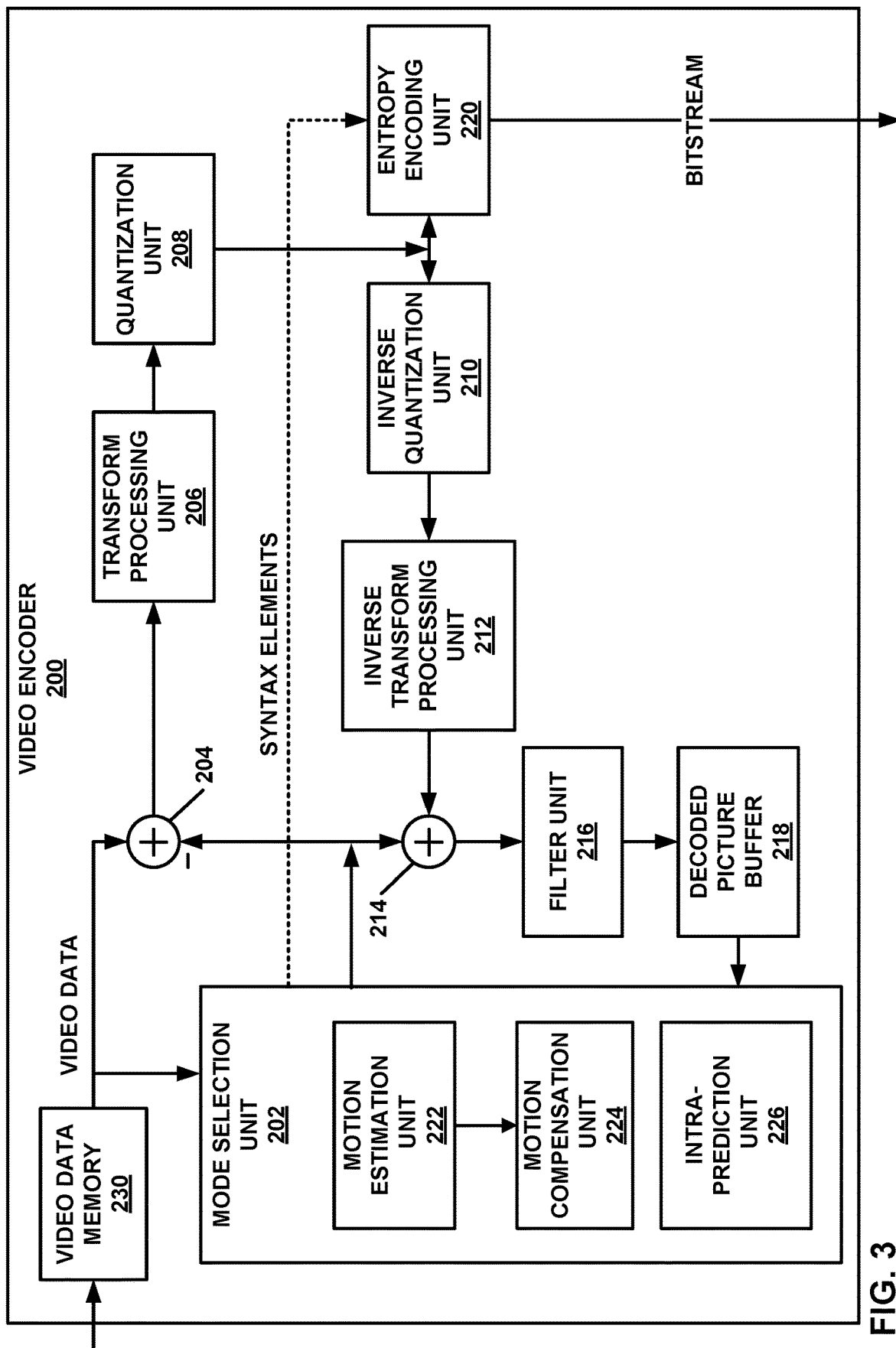
FIG. 3 is a block diagram illustrating an example video encoder that may perform the techniques of this disclosure.

FIG. 3 is a block diagram illustrating an example video encoder 200 that may perform the techniques of this disclosure. FIG. 3 is provided for purposes of explanation and should not be considered limiting of the techniques as broadly exemplified and described in this disclosure. For purposes of explanation, this disclosure describes video encoder 200 in the context of video coding standards such as the HEVC video coding standard and the H.266 video coding standard in development. However, the techniques of this disclosure are not limited to these video coding standards, and are applicable generally to video encoding and decoding.

In the example of FIG. 3, video encoder 200 includes video data memory 230, mode selection unit 202, residual generation unit 204, transform processing unit 206, quantization unit 208, inverse quantization unit 210, inverse transform processing unit 212, reconstruction unit 214, filter unit 216, decoded picture buffer (DPB) 218, and entropy encoding unit 220. Any or all of video data memory 230, mode selection unit 202, residual generation unit 204, transform processing unit 206, quantization unit 208, inverse quantization unit 210, inverse transform processing unit 212, reconstruction unit 214, filter unit 216, DPB 218, and entropy encoding unit 220 may be implemented in one or more processors or in processing circuitry. Moreover, video encoder 200 may include additional or alternative processors or processing circuitry to perform these and other functions.

Video data memory 230 may store video data to be encoded by the components of video encoder 200. Video encoder 200 may receive the video data stored in video data memory 230 from, for example, video source 104 (FIG. 1). DPB 218 may act as a reference picture memory that stores reference video data for use in prediction of subsequent video data by video encoder 200. Video data memory 230 and DPB 218 may be formed by any of a variety of memory devices, such as dynamic random access memory (DRAM), including synchronous DRAM (SDRAM), magnetoresistive RAM (MRAM), resistive RAM (RRAM), or other types of memory devices. Video data memory 230 and DPB 218 may be provided by the same memory device or separate memory devices. In various examples, video data memory 230 may be on-chip with other components of video encoder 200, as illustrated, or off-chip relative to those components.

In this disclosure, reference to video data memory 230 should not be interpreted as being limited to memory internal to video encoder 200, unless specifically described as such, or memory external to video encoder 200, unless specifically described as such. Rather, reference to video data memory 230 should be understood as reference memory that stores video data that video encoder 200 receives for encoding (e.g., video data for a current block that is to be encoded). Memory 106 of FIG. 1 may also provide temporary storage of outputs from the various units of video encoder 200.

The various units of FIG. 3 are illustrated to assist with understanding the operations performed by video encoder 200. The units may be implemented as fixed-function circuits, programmable circuits, or a combination thereof. Fixed-function circuits refer to circuits that provide particular functionality, and are preset on the operations that can be performed. Programmable circuits refer to circuits that can be programmed to perform various tasks, and provide flexible functionality in the operations that can be performed. For instance, programmable circuits may execute software or firmware that cause the programmable circuits to operate in the manner defined by instructions of the software or firmware. Fixed-function circuits may execute software instructions (e.g., to receive parameters or output parameters), but the types of operations that the fixed-function circuits perform are generally immutable. In some examples, the one or more units may be distinct circuit blocks (fixed-function or programmable), and in some examples, the one or more units may be integrated circuits.

Video encoder 200 may include arithmetic logic units (ALUs), elementary function units (EFUs), digital circuits, analog circuits, and/or programmable cores, formed from programmable circuits. In examples where the operations of video encoder 200 are performed using software executed by the programmable circuits, memory 106 (FIG. 1) may store the object code of the software that video encoder 200 receives and executes, or another memory within video encoder 200 (not shown) may store such instructions.

Video data memory 230 is configured to store received video data. Video encoder 200 may retrieve a picture of the video data from video data memory 230 and provide the video data to residual generation unit 204 and mode selection unit 202. Video data in video data memory 230 may be raw video data that is to be encoded.

Mode selection unit 202 includes a motion estimation unit 222, motion compensation unit 224, and an intra-prediction unit 226. Mode selection unit 202 may include additional functional units to perform video prediction in accordance with other prediction modes. As examples, mode selection unit 202 may include a palette unit, an intra-block copy unit (which may be part of motion estimation unit 222 and/or motion compensation unit 224), an affine unit, a linear model (LM) unit, or the like.

Mode selection unit 202 generally coordinates multiple encoding passes to test combinations of encoding parameters and resulting rate-distortion values for such combinations. The encoding parameters may include partitioning of CTUs into CUs, prediction modes for the CUs, transform types for residual data of the CUs, quantization parameters for residual data of the CUs, and so on. Mode selection unit 202 may ultimately select the combination of encoding parameters having rate-distortion values that are better than the other tested combinations.

Mode selection unit 202 may further be configured, according to the techniques of this disclosure, to enable or disable various coding tools. For example, mode selection unit 202 may determine a set of coding tools that can be enabled for an entire video presentation. Within the set of coding tools that can be enabled, mode selection unit 202 may determine that certain coding tools need not be enabled for a particular coding sequence. Furthermore, all of the coding tools that can be enabled may be within a particular profile indicated by a profile indicator (profile_idc).

Examples of the various coding tools that may be enabled or disabled include use of binary-ternary trees (BTTs), split unit coding order (SUCO), adaptive motion vector resolution (AMVR), merge motion vector difference (MMVD), affine mode, decoder-side motion vector derivation (DMVR), adaptive loop filtering (ALF), advanced motion vector prediction (AMVP), intra-block copy (IBC), and signaling reference picture list (RPL) data in a picture header (PH) or slice header (SH).

Mode selection unit 202 may receive input from an administrator or other user designating certain coding tools that are to be capable of being enabled, and others that are to be disabled. Within the set of coding tools that are capable of being enabled, mode selection unit 202 may test coding of a sequence of pictures with and without those coding tools. If the test run reveals that one or more of these coding tools is unneeded for the sequence, mode selection unit 202 may disable those coding tools. If one or more of the coding tools is needed (e.g., use of the coding tools results in a lower rate-distortion value than having the tool disabled), mode selection unit 202 may enable the coding tool.

Mode selection unit 202 may encode a sequence parameter set (SPS) for a sequence of pictures. The SPS may include a profile indicator (profile_idc), as well as one or more values representing coding-tool-specific constraints, separate from the profile indicator. The coding-tool-specific constraints may indicate a set of coding tools that may be enabled or disabled for an individual sequence. Each SPS in a common video program may have the same values of the profile indicator and the coding-tool-specific constraints. However, for a particular sequence of pictures, mode selection unit 202 may disable one or more of the coding tools that can be disabled, per the coding-tool-specific constraints. For each disabled coding tool, mode selection unit 202 may avoid encoding further data for the coding tools, e.g., initialization data for the coding tools that would be needed to use the coding tools, because those coding tools are disabled. In this manner, the size of an SPS for a sequence of pictures for which one or more coding tools is disabled may be reduced, compared to an SPS for a sequence of pictures for which all (or more) of the coding tools are enabled.

In one example, mode selection unit 202 may encode the coding-tool-specific constraints as one or more values for a toolset indicator (toolset_idc) syntax element, as shown in Table 1 above. For example, the value for toolset_idc may act as an array of bits, where each bit corresponds to a different coding tool. A binary one for the coding tool may indicate that the coding tool may be enabled for a sequence of pictures, whereas a binary zero for the coding tool may indicate that the coding tool is disabled. Mode selection unit 202 may separately, for each coding tool that can be enabled, encode data representing whether that coding tool is in fact enabled, and if so, any data for initializing or otherwise using that coding tool. Mode selection unit 202 may include this data in the SPS, a picture parameter set (PPS) referring to the SPS, a picture header (PH) of a picture included in a sequence represented by the SPS, a slice header (SH) of the picture, or a block header of a block of the slice or picture. Likewise, mode selection unit 202 may control the various elements of video encoder 200 to use enabled coding tools and avoid using disabled coding tools during encoding of video data, as discussed below.

Video encoder 200 may partition a picture retrieved from video data memory 230 into a series of CTUs, and encapsulate one or more CTUs within a slice. Mode selection unit 202 may partition a CTU of the picture in accordance with a tree structure, such as the QTBT structure or the quad-tree structure of HEVC described above. As described above, video encoder 200 may form one or more CUs from partitioning a CTU according to the tree structure. Such a CU may also be referred to generally as a "video block" or "block."

In general, mode selection unit 202 also controls the components thereof (e.g., motion estimation unit 222, motion compensation unit 224, and intra-prediction unit 226) to generate a prediction block for a current block (e.g., a current CU, or in HEVC, the overlapping portion of a PU and a TU). For inter-prediction of a current block, motion estimation unit 222 may perform a motion search to identify one or more closely matching reference blocks in one or more reference pictures (e.g., one or more previously coded pictures stored in DPB 218). In particular, motion estimation unit 222 may calculate a value representative of how similar a potential reference block is to the current block, e.g., according to sum of absolute difference (SAD), sum of squared differences (SSD), mean absolute difference (MAD), mean squared differences (MSD), or the like. Motion estimation unit 222 may generally perform these calculations using sample-by-sample differences between the current block and the reference block being considered. Motion estimation unit 222 may identify a reference block having a lowest value resulting from these calculations, indicating a reference block that most closely matches the current block.

Motion estimation unit 222 may form one or more motion vectors (MVs) that defines the positions of the reference blocks in the reference pictures relative to the position of the current block in a current picture. Motion estimation unit 222 may then provide the motion vectors to motion compensation unit 224. For example, for uni-directional inter-prediction, motion estimation unit 222 may provide a single motion vector, whereas for bi-directional inter-prediction, motion estimation unit 222 may provide two motion vectors. Motion compensation unit 224 may then generate a prediction block using the motion vectors. For example, motion compensation unit 224 may retrieve data of the reference block using the motion vector. As another example, if the motion vector has fractional sample precision, motion compensation unit 224 may interpolate values for the prediction block according to one or more interpolation filters. Moreover, for bi-directional inter-prediction, motion compensation unit 224 may retrieve data for two reference blocks identified by respective motion vectors and combine the retrieved data, e.g., through sample-by-sample averaging or weighted averaging.

As another example, for intra-prediction, or intra-prediction coding, intra-prediction unit 226 may generate the prediction block from samples neighboring the current block. For example, for directional modes, intra-prediction unit 226 may generally mathematically combine values of neighboring samples and populate these calculated values in the defined direction across the current block to produce the prediction block. As another example, for DC mode, intra-prediction unit 226 may calculate an average of the neighboring samples to the current block and generate the prediction block to include this resulting average for each sample of the prediction block.

Mode selection unit 202 provides the prediction block to residual generation unit 204. Residual generation unit 204 receives a raw, uncoded version of the current block from video data memory 230 and the prediction block from mode selection unit 202. Residual generation unit 204 calculates sample-by-sample differences between the current block and the prediction block. The resulting sample-by-sample differences define a residual block for the current block. In some examples, residual generation unit 204 may also determine differences between sample values in the residual block to generate a residual block using residual differential pulse code modulation (RDPCM). In some examples, residual generation unit 204 may be formed using one or more subtractor circuits that perform binary subtraction.

In examples where mode selection unit 202 partitions CUs into PUs, each PU may be associated with a luma prediction unit and corresponding chroma prediction units. Video encoder 200 and video decoder 300 may support PUs having various sizes. As indicated above, the size of a CU may refer to the size of the luma coding block of the CU and the size of a PU may refer to the size of a luma prediction unit of the PU. Assuming that the size of a particular CU is 2N×2N, video encoder 200 may support PU sizes of 2N×2N or N×N for intra prediction, and symmetric PU sizes of 2N×2N, 2N×N, N×2N, N×N, or similar for inter prediction. Video encoder 200 and video decoder 300 may also support asymmetric partitioning for PU sizes of 2N×nU, 2N×nD, nL×2N, and nR×2N for inter prediction.

In examples where mode selection unit does not further partition a CU into PUs, each CU may be associated with a luma coding block and corresponding chroma coding blocks. As above, the size of a CU may refer to the size of the luma coding block of the CU. The video encoder 200 and video decoder 120 may support CU sizes of 2N×2N, 2N×N, or N×2N.

For other video coding techniques such as an intra-block copy mode coding, an affine-mode coding, and linear model (LM) mode coding (if enabled), as a few examples, mode selection unit 202, via respective units associated with the coding techniques, generates a prediction block for the current block being encoded. In some examples, such as palette mode coding, mode selection unit 202 may not generate a prediction block, and instead generate syntax elements that indicate the manner in which to reconstruct the block based on a selected palette. In such modes, mode selection unit 202 may provide these syntax elements to entropy encoding unit 220 to be encoded.

As described above, residual generation unit 204 receives the video data for the current block and the corresponding prediction block. Residual generation unit 204 then generates a residual block for the current block. To generate the residual block, residual generation unit 204 calculates sample-by-sample differences between the prediction block and the current block.

Transform processing unit 206 applies one or more transforms to the residual block to generate a block of transform coefficients (referred to herein as a "transform coefficient block"). Transform processing unit 206 may apply various transforms to a residual block to form the transform coefficient block. For example, transform processing unit 206 may apply a discrete cosine transform (DCT), a directional transform, a Karhunen-Loeve transform (KLT), or a conceptually similar transform to a residual block. In some examples, transform processing unit 206 may perform multiple transforms to a residual block, e.g., a primary transform and a secondary transform, such as a rotational transform. In some examples, transform processing unit 206 does not apply transforms to a residual block.

Quantization unit 208 may quantize the transform coefficients in a transform coefficient block to produce a quantized transform coefficient block. Quantization unit 208 may quantize transform coefficients of a transform coefficient block according to a quantization parameter (QP) value associated with the current block. Video encoder 200 (e.g., via mode selection unit 202) may adjust the degree of quantization applied to the transform coefficient blocks associated with the current block by adjusting the QP value associated with the CU. Quantization may introduce loss of information, and thus, quantized transform coefficients may have lower precision than the original transform coefficients produced by transform processing unit 206.

Inverse quantization unit 210 and inverse transform processing unit 212 may apply inverse quantization and inverse transforms to a quantized transform coefficient block, respectively, to reconstruct a residual block from the transform coefficient block. Reconstruction unit 214 may produce a reconstructed block corresponding to the current block (albeit potentially with some degree of distortion) based on the reconstructed residual block and a prediction block generated by mode selection unit 202. For example, reconstruction unit 214 may add samples of the reconstructed residual block to corresponding samples from the prediction block generated by mode selection unit 202 to produce the reconstructed block.

Filter unit 216 may perform one or more filter operations on reconstructed blocks. For example, filter unit 216 may perform deblocking operations to reduce blockiness artifacts along edges of CUs. Operations of filter unit 216 may be skipped, in some examples.

Video encoder 200 stores reconstructed blocks in DPB 218. For instance, in examples where operations of filter unit 216 are not needed, reconstruction unit 214 may store reconstructed blocks to DPB 218. In examples where operations of filter unit 216 are needed, filter unit 216 may store the filtered reconstructed blocks to DPB 218. Motion estimation unit 222 and motion compensation unit 224 may retrieve a reference picture from DPB 218, formed from the reconstructed (and potentially filtered) blocks, to inter-predict blocks of subsequently encoded pictures. In addition, intra-prediction unit 226 may use reconstructed blocks in DPB 218 of a current picture to intra-predict other blocks in the current picture.

In general, entropy encoding unit 220 may entropy encode syntax elements received from other functional components of video encoder 200. For example, entropy encoding unit 220 may entropy encode quantized transform coefficient blocks from quantization unit 208. As another example, entropy encoding unit 220 may entropy encode prediction syntax elements (e.g., motion information for inter-prediction or intra-mode information for intra-prediction) from mode selection unit 202. Entropy encoding unit 220 may perform one or more entropy encoding operations on the syntax elements, which are another example of video data, to generate entropy-encoded data. For example, entropy encoding unit 220 may perform a context-adaptive variable length coding (CAVLC) operation, a CABAC operation, a variable-to-variable (V2V) length coding operation, a syntax-based context-adaptive binary arithmetic coding (SBAC) operation, a Probability Interval Partitioning Entropy (PIPE) coding operation, an Exponential-Golomb encoding operation, or another type of entropy encoding operation on the data. In some examples, entropy encoding unit 220 may operate in bypass mode where syntax elements are not entropy encoded.

Video encoder 200 may output a bitstream that includes the entropy encoded syntax elements needed to reconstruct blocks of a slice or picture. In particular, entropy encoding unit 220 may output the bitstream.

The operations described above are described with respect to a block. Such description should be understood as being operations for a luma coding block and/or chroma coding blocks. As described above, in some examples, the luma coding block and chroma coding blocks are luma and chroma components of a CU. In some examples, the luma coding block and the chroma coding blocks are luma and chroma components of a PU.

In some examples, operations performed with respect to a luma coding block need not be repeated for the chroma coding blocks. As one example, operations to identify a motion vector (MV) and reference picture for a luma coding block need not be repeated for identifying a MV and reference picture for the chroma blocks. Rather, the MV for the luma coding block may be scaled to determine the MV for the chroma blocks, and the reference picture may be the same. As another example, the intra-prediction process may be the same for the luma coding block and the chroma coding blocks.

Video encoder 200 represents an example of a device configured to encode video data including a memory configured to store video data, and one or more processors implemented in circuitry and configured to: encode a value for a profile indicator syntax element in a bitstream including video data, the value for the profile indicator representing a class of a profile to which the bitstream conforms; encode one or more values representing one or more coding-tool-specific constraints, separate from the profile indicator syntax element, each of the coding-tool-specific constraints indicating whether coding tools corresponding to the coding-tool-specific constraints can be enabled for at least a subset of the bitstream; and encode the video data according to the coding-tool-specific constraints and the class of the profile.

Figure 4:
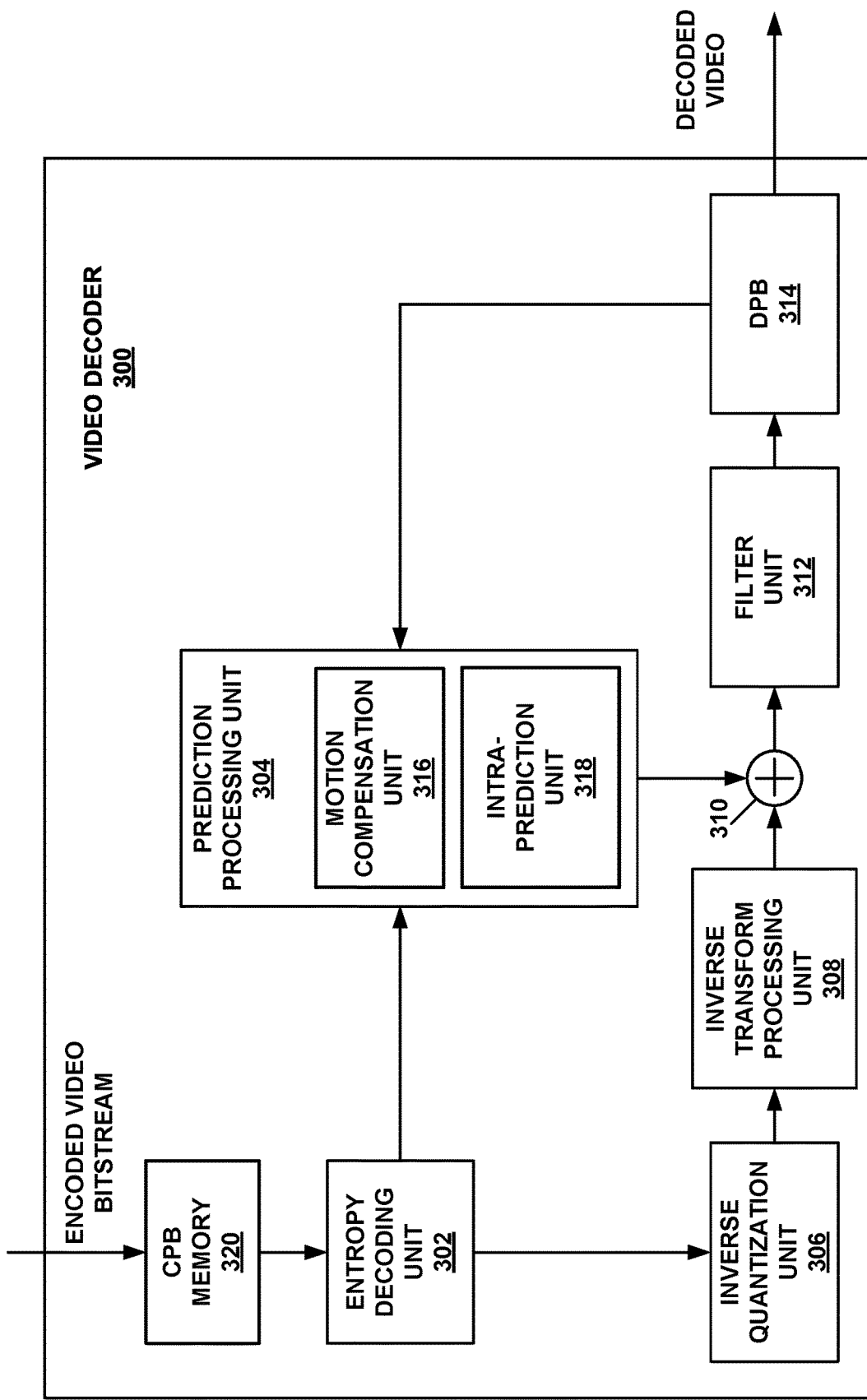
FIG. 4 is a block diagram illustrating an example video decoder that may perform the techniques of this disclosure.

FIG. 4 is a block diagram illustrating an example video decoder 300 that may perform the techniques of this disclosure. FIG. 4 is provided for purposes of explanation and is not limiting on the techniques as broadly exemplified and described in this disclosure. For purposes of explanation, this disclosure describes video decoder 300 according to the techniques of VVC and HEVC. However, the techniques of this disclosure may be performed by video coding devices that are configured to other video coding standards.

In the example of FIG. 4, video decoder 300 includes coded picture buffer (CPB) memory 320, entropy decoding unit 302, prediction processing unit 304, inverse quantization unit 306, inverse transform processing unit 308, reconstruction unit 310, filter unit 312, and decoded picture buffer (DPB) 314. Any or all of CPB memory 320, entropy decoding unit 302, prediction processing unit 304, inverse quantization unit 306, inverse transform processing unit 308, reconstruction unit 310, filter unit 312, and DPB 314 may be implemented in one or more processors or in processing circuitry. Moreover, video decoder 300 may include additional or alternative processors or processing circuitry to perform these and other functions.

Prediction processing unit 304 includes motion compensation unit 316 and intra-prediction unit 318. Prediction processing unit 304 may include addition units to perform prediction in accordance with other prediction modes. As examples, prediction processing unit 304 may include a palette unit, an intra-block copy unit (which may form part of motion compensation unit 316), an affine unit, a linear model (LM) unit, or the like. In other examples, video decoder 300 may include more, fewer, or different functional components.

CPB memory 320 may store video data, such as an encoded video bitstream, to be decoded by the components of video decoder 300. The video data stored in CPB memory 320 may be obtained, for example, from computer-readable medium 110 (FIG. 1). CPB memory 320 may include a CPB that stores encoded video data (e.g., syntax elements) from an encoded video bitstream. Also, CPB memory 320 may store video data other than syntax elements of a coded picture, such as temporary data representing outputs from the various units of video decoder 300. DPB 314 generally stores decoded pictures, which video decoder 300 may output and/or use as reference video data when decoding subsequent data or pictures of the encoded video bitstream. CPB memory 320 and DPB 314 may be formed by any of a variety of memory devices, such as dynamic random access memory (DRAM), including synchronous DRAM (SDRAM), magnetoresistive RAM (MRAM), resistive RAM (RRAM), or other types of memory devices. CPB memory 320 and DPB 314 may be provided by the same memory device or separate memory devices. In various examples, CPB memory 320 may be on-chip with other components of video decoder 300, or off-chip relative to those components.

Additionally or alternatively, in some examples, video decoder 300 may retrieve coded video data from memory 120 (FIG. 1). That is, memory 120 may store data as discussed above with CPB memory 320. Likewise, memory 120 may store instructions to be executed by video decoder 300, when some or all of the functionality of video decoder 300 is implemented in software to be executed by processing circuitry of video decoder 300.

The various units shown in FIG. 4 are illustrated to assist with understanding the operations performed by video decoder 300. The units may be implemented as fixed-function circuits, programmable circuits, or a combination thereof. Similar to FIG. 3, fixed-function circuits refer to circuits that provide particular functionality, and are preset on the operations that can be performed. Programmable circuits refer to circuits that can be programmed to perform various tasks, and provide flexible functionality in the operations that can be performed. For instance, programmable circuits may execute software or firmware that cause the programmable circuits to operate in the manner defined by instructions of the software or firmware. Fixed-function circuits may execute software instructions (e.g., to receive parameters or output parameters), but the types of operations that the fixed-function circuits perform are generally immutable. In some examples, the one or more of the units may be distinct circuit blocks (fixed-function or programmable), and in some examples, the one or more units may be integrated circuits.

Video decoder 300 may include ALUs, EFUs, digital circuits, analog circuits, and/or programmable cores formed from programmable circuits. In examples where the operations of video decoder 300 are performed by software executing on the programmable circuits, on-chip or off-chip memory may store instructions (e.g., object code) of the software that video decoder 300 receives and executes.

In accordance with the techniques of this disclosure, entropy decoding unit 302 may decode a sequence parameter set (SPS) for a sequence of pictures. The SPS may include a profile indicator (profile_idc) representing a profile to which a video bitstream including the sequence of pictures conforms. The SPS may also include a set of one or more values representing coding-tool-specific constraints for the sequence of pictures, where the coding-tool-specific constraints may represent whether respective coding tools can be enabled for the sequence of pictures. Entropy decoding unit 302 may further decode data representing whether, for each of the coding tools that can be enabled, the coding tool is in fact enabled, as well as any initialization information or other data needed to use the coding tool for the sequence of pictures. Entropy decoding unit 302 may further determine that the SPS will not include data for disabled coding tools, and therefore, may determine whether bits of the video bitstream correspond to data for those coding tools or other data according to whether the coding tools can be enabled or not. Thus, entropy decoding unit 302 may adjust parsing decisions made during parsing and decoding of the video bitstream according to whether certain coding tools can be enabled or not.

Entropy decoding unit 302 may further provide parameters for enabled coding tools to other components of video decoder 300. For example, entropy decoding unit 302 may provide data indicating whether certain coding tools are enabled, as well as any initialization information or other data needed to use the enabled coding tools, to the other components of video decoder 300.

Examples of the various coding tools that may be enabled or disabled include use of binary-ternary trees (BTTs), split unit coding order (SUCO), adaptive motion vector resolution (AMVR), merge motion vector difference (MMVD), affine mode, decoder-side motion vector derivation (DMVR), adaptive loop filtering (ALF), advanced motion vector prediction (AMVP), intra-block copy (IBC), and signaling reference picture list (RPL) data in a picture header (PH) or slice header (SH).

Thus, for example, entropy decoding unit 302 may provide an indication of whether MMVD is enabled to motion compensation unit 316. If MMVD is enabled, motion compensation unit 316 may determine whether motion information for a particular block of video data is encoded using conventional merge mode, advanced motion vector prediction (AMVP), or MMVD, and if MMVD, to reproduce a motion vector for the block using MMVD. As another example, if DMVR is enabled, entropy decoding unit 302 may provide an indication that DMVR is enabled and motion compensation unit 316 may perform DMVR for certain blocks for which motion information is to be reproduced using DMVR. As still another example, if IBC is enabled, entropy decoding unit 302 may provide an indication that IBC is enabled to prediction processing unit 304, and motion compensation unit 316 may perform IBC for certain blocks accordingly.

Entropy decoding unit 302 may receive encoded video data from the CPB and entropy decode the video data to reproduce syntax elements. Prediction processing unit 304, inverse quantization unit 306, inverse transform processing unit 308, reconstruction unit 310, and filter unit 312 may generate decoded video data based on the syntax elements extracted from the bitstream.

In general, video decoder 300 reconstructs a picture on a block-by-block basis. Video decoder 300 may perform a reconstruction operation on each block individually (where the block currently being reconstructed, i.e., decoded, may be referred to as a "current block").

Entropy decoding unit 302 may entropy decode syntax elements defining quantized transform coefficients of a quantized transform coefficient block, as well as transform information, such as a quantization parameter (QP) and/or transform mode indication(s). Inverse quantization unit 306 may use the QP associated with the quantized transform coefficient block to determine a degree of quantization and, likewise, a degree of inverse quantization for inverse quantization unit 306 to apply. Inverse quantization unit 306 may, for example, perform a bitwise left-shift operation to inverse quantize the quantized transform coefficients. Inverse quantization unit 306 may thereby form a transform coefficient block including transform coefficients.

After inverse quantization unit 306 forms the transform coefficient block, inverse transform processing unit 308 may apply one or more inverse transforms to the transform coefficient block to generate a residual block associated with the current block. For example, inverse transform processing unit 308 may apply an inverse DCT, an inverse integer transform, an inverse Karhunen-Loeve transform (KLT), an inverse rotational transform, an inverse directional transform, or another inverse transform to the coefficient block.

Furthermore, prediction processing unit 304 generates a prediction block according to prediction information syntax elements that were entropy decoded by entropy decoding unit 302. For example, if the prediction information syntax elements indicate that the current block is inter-predicted, motion compensation unit 316 may generate the prediction block. In this case, the prediction information syntax elements may indicate a reference picture in DPB 314 from which to retrieve a reference block, as well as a motion vector identifying a location of the reference block in the reference picture relative to the location of the current block in the current picture. Motion compensation unit 316 may generally perform the inter-prediction process in a manner that is substantially similar to that described with respect to motion compensation unit 224 (FIG. 3).

As another example, if the prediction information syntax elements indicate that the current block is intra-predicted, intra-prediction unit 318 may generate the prediction block according to an intra-prediction mode indicated by the prediction information syntax elements. Again, intra-prediction unit 318 may generally perform the intra-prediction process in a manner that is substantially similar to that described with respect to intra-prediction unit 226 (FIG. 3). Intra-prediction unit 318 may retrieve data of neighboring samples to the current block from DPB 314.

Reconstruction unit 310 may reconstruct the current block using the prediction block and the residual block. For example, reconstruction unit 310 may add samples of the residual block to corresponding samples of the prediction block to reconstruct the current block.

Filter unit 312 may perform one or more filter operations on reconstructed blocks. For example, filter unit 312 may perform deblocking operations to reduce blockiness artifacts along edges of the reconstructed blocks. Operations of filter unit 312 are not necessarily performed in all examples.

Video decoder 300 may store the reconstructed blocks in DPB 314. As discussed above, DPB 314 may provide reference information, such as samples of a current picture for intra-prediction and previously decoded pictures for subsequent motion compensation, to prediction processing unit 304. Moreover, video decoder 300 may output decoded pictures from DPB 314 for subsequent presentation on a display device, such as display device 118 of FIG. 1.

In this manner, video decoder 300 represents an example of a video decoding device including a memory configured to store video data, and one or more processors implemented in circuitry and configured to: decode a value for a profile indicator syntax element in a bitstream including video data, the value for the profile indicator representing a class of a profile to which the bitstream conforms; decode one or more values representing one or more coding-tool-specific constraints, separate from the profile indicator syntax element, each of the coding-tool-specific constraints indicating whether coding tools corresponding to the coding-tool-specific constraints can be enabled for at least a subset of the bitstream; and decode the video data according to the coding-tool-specific constraints and the class of the profile.

Figure 5:
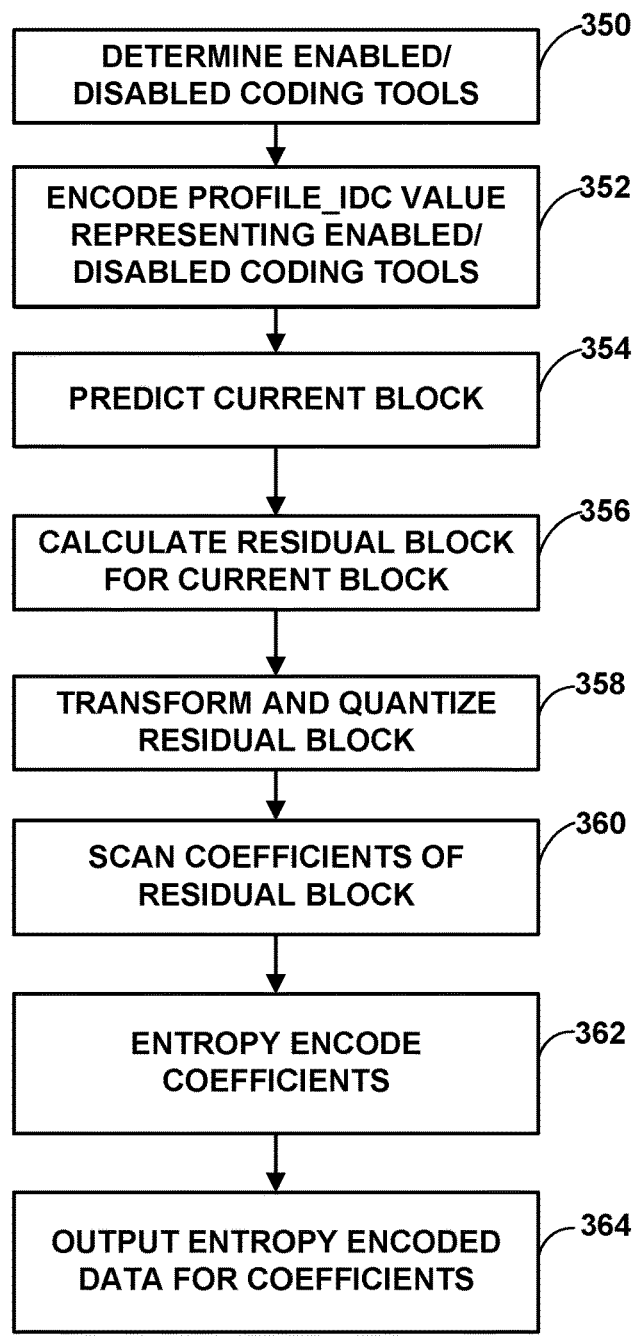
FIG. 5 is a flowchart illustrating an example method for encoding a current block in accordance with the techniques of this disclosure.

FIG. 5 is a flowchart illustrating an example method for encoding a current block in accordance with the techniques of this disclosure. The current block may comprise a current CU. Although described with respect to video encoder 200 (FIGS. 1 and 3), it should be understood that other devices may be configured to perform a method similar to that of FIG. 5.

In this example, video encoder 200 initially determines enabled and disabled coding tools of a profile of a video coding standard (350). Video encoder 200 then encodes a value for a profile_idc value representing which of the coding tools are enabled and disabled (352), e.g., as discussed above. Video encoder 200 may then predict the current block (354) using the enabled coding tools and without using disabled coding tools. For example, video encoder 200 may form a prediction block for the current block. Video encoder 200 may then calculate a residual block for the current block (356). To calculate the residual block, video encoder 200 may calculate a difference between the original, uncoded block and the prediction block for the current block. Video encoder 200 may then transform and quantize coefficients of the residual block (358). Next, video encoder 200 may scan the quantized transform coefficients of the residual block (360). During the scan, or following the scan, video encoder 200 may entropy encode the coefficients (362). For example, video encoder 200 may encode the coefficients using CAVLC or CABAC. Video encoder 200 may then output the entropy coded data of the block (364). It should be understood that the various steps of the coding process described in FIG. 5 would only include coding using the enabled coding tools and not using the disabled coding tools.

In this manner, the method of FIG. 5 represents an example of a method including determining a maximum value for a range of possible values for a profile indicator syntax element, the profile indicator syntax element representing a set of coding tools used to code video data of a bitstream; coding a value for the profile indicator syntax element in the bitstream, the value being less than the maximum value; determining one or more of the coding tools that are not used to code the video data of the bitstream, the one or more of the coding tools represented by the value for the profile indicator syntax element; and coding the video data using remaining coding tools of the set of coding tools, excluding the one or more of the coding tools represented by the value for the profile indicator syntax element.

Figure 6:
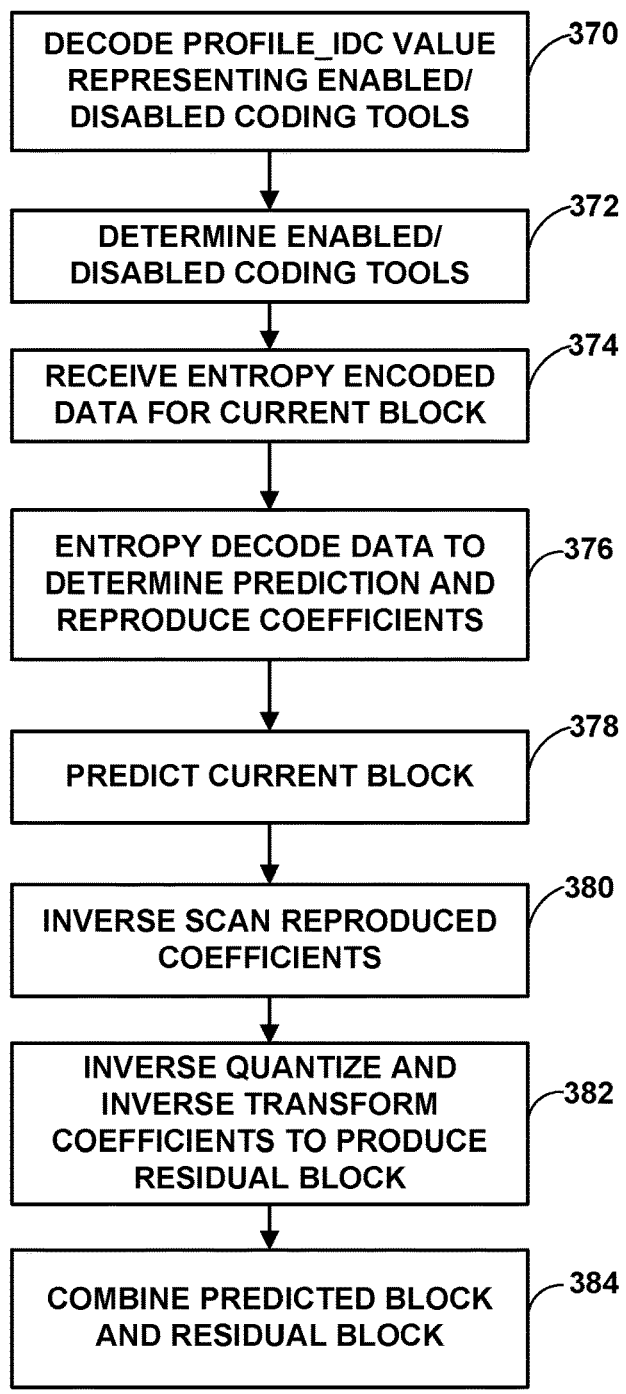
FIG. 6 is a flowchart illustrating an example method for decoding a current block in accordance with the techniques of this disclosure.

FIG. 6 is a flowchart illustrating an example method for decoding a current block in accordance with the techniques of this disclosure. The current block may comprise a current CU. Although described with respect to video decoder 300 (FIGS. 1 and 4), it should be understood that other devices may be configured to perform a method similar to that of FIG. 6.

In this example, video decoder 300 may initially decode a value for a profile_idc syntax element representing enabled and disabled coding tools (370). Video decoder 300 may then determine which of the coding tools are enabled and disabled using the value for the profile_idc syntax element (372). Video decoder 300 may then receive entropy coded data for the current block, such as entropy coded prediction information and entropy coded data for coefficients of a residual block corresponding to the current block (374). Video decoder 300 may entropy decode the entropy coded data to determine prediction information for the current block and to reproduce coefficients of the residual block (376). Video decoder 300 may predict the current block (378), e.g., using an intra- or inter-prediction mode as indicated by the prediction information for the current block, to calculate a prediction block for the current block. Video decoder 300 may then inverse scan the reproduced coefficients (380), to create a block of quantized transform coefficients. Video decoder 300 may then inverse quantize and inverse transform the coefficients to produce a residual block (382). Video decoder 300 may ultimately decode the current block by combining the prediction block and the residual block (384). It should be understood that the various steps of the coding process described in FIG. 6 would only include coding using the enabled coding tools and not using the disabled coding tools. Likewise, video decoder 300 would avoid coding data for syntax elements corresponding to disabled coding tools.

In this manner, the method of FIG. 6 represents an example of a method including determining a maximum value for a range of possible values for a profile indicator syntax element, the profile indicator syntax element representing a set of coding tools used to code video data of a bitstream; coding a value for the profile indicator syntax element in the bitstream, the value being less than the maximum value; determining one or more of the coding tools that are not used to code the video data of the bitstream, the one or more of the coding tools represented by the value for the profile indicator syntax element; and coding the video data using remaining coding tools of the set of coding tools, excluding the one or more of the coding tools represented by the value for the profile indicator syntax element.

Figure 7:
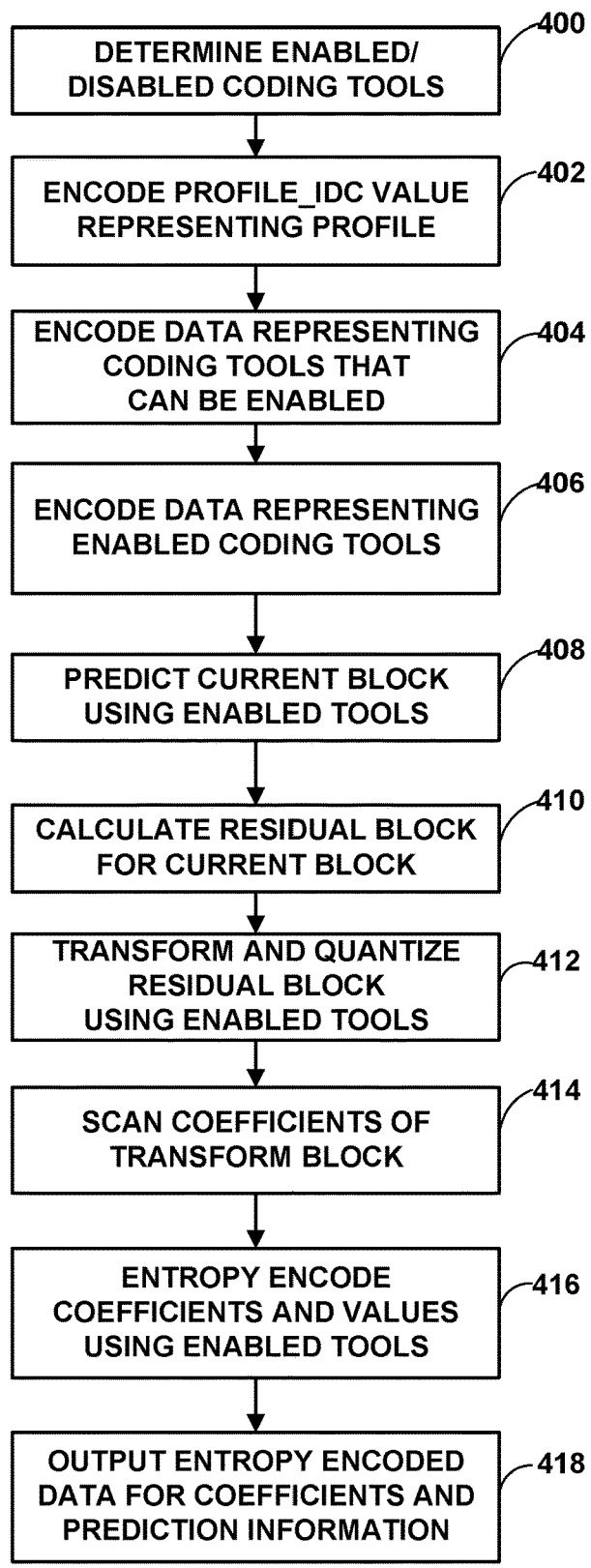
FIG. 7 is a flowchart illustrating an example method of encoding video data according to the techniques of this disclosure.

FIG. 7 is a flowchart illustrating an example method of encoding video data according to the techniques of this disclosure. Although described with respect to video encoder 200 (FIGS. 1 and 3), it should be understood that other devices may be configured to perform a method similar to that of FIG. 7.

Initially, video encoder 200 may determine enabled and disabled coding tools (400). For example, as discussed above, mode selection unit 202 may receive configuration data from an administrator or other user indicating certain coding tools that are to be fully disabled for an entire video program. Likewise, among those coding tools that can be enabled, mode selection unit 202 may perform multiple test encoding runs with the coding tools enabled or disabled, and measure rate-distortion metrics for each run. When a coding tool does not improve rate-distortion metrics, mode selection unit 202 may disable that coding tool.

Video encoder 200 may encode a SPS including a profile indicator (profile_idc) representing a class of a profile to which a bitstream conforms (402). Within a given profile, various coding tools may be available. However, according to the techniques of this disclosure, certain coding tools may be disabled for an entire video program, such that a video decoder can be developed that supports the enabled coding tools while also technically complying with the profile. Thus, video encoder 200 may encode data representing which coding tools within the profile can be enabled (404), and thus, which coding tools within the profile will not be enabled. That is, video encoder 200 may encode values for coding-tool-specific constraints, representing whether the coding tools can or cannot be enabled for at least a subset of the bitstream. The profile indicator and the data representing the coding-tool-specific constraints (i.e., the coding tools that can be enabled) may remain the same across all SPSs of the video program. Within a given sequence of pictures, video encoder 200 may encode data representing whether the coding tools are in fact enabled or disabled (406).

Video encoder 200 may then encode each picture of the sequence of pictures. In general, encoding of the pictures includes partitioning the pictures into blocks, and individually encoding each block. For example, video encoder 200 may predict a current block using the enabled coding tools (408). As an example, video encoder 200 may determine whether to predict the block using conventional intra-prediction or conventional inter-prediction. For coding tools such as intra-block copy, merge with motion vector difference (MMVD), affine mode, DMVR, or the like, video encoder 200 may select from among these modes as well, if they are enabled as indicated above. Video encoder 200 may ultimately generate a prediction block using the prediction mode, as well as prediction information (e.g., motion information or other information indicating how to generate the prediction block).

Video encoder 200 may then calculate a residual block for the current block (410). In particular, video encoder 200 may calculate sample-by-sample differences between the current block and the prediction block to generate the residual block. Video encoder 200 may further transform and quantize the residual block using the enabled coding tools (412). For example, video encoder 200 may select from among discrete cosine transform (DCT), discrete sine transform (DST), Karhunen-Loeve Transforms (KLTs), secondary transforms, rotational transforms, or the like, if enabled, to transform the block from a spatial (or pixel) domain to a transform (or frequency) domain.

Video encoder 200 may then scan the coefficients of the resulting transform block (414). During the scan, or following the scan, video encoder 200 may entropy encode the coefficients and other values for syntax elements using the enabled coding tools (416). Video encoder 200 may further output the entropy encoded data for the coefficients and other values (e.g., prediction information) (418).

In this manner, the method of FIG. 7 represents an example of a method of encoding video data, the method including encoding a value for a profile indicator syntax element in a bitstream including video data, the value for the profile indicator representing a class of a profile to which the bitstream conforms; encoding one or more values representing one or more coding-tool-specific constraints, separate from the profile indicator syntax element, each of the coding-tool-specific constraints indicating whether coding tools corresponding to the coding-tool-specific constraints can be enabled for at least a subset of the bitstream; and encoding the video data according to the coding-tool-specific constraints and the class of the profile.

Figure 8:
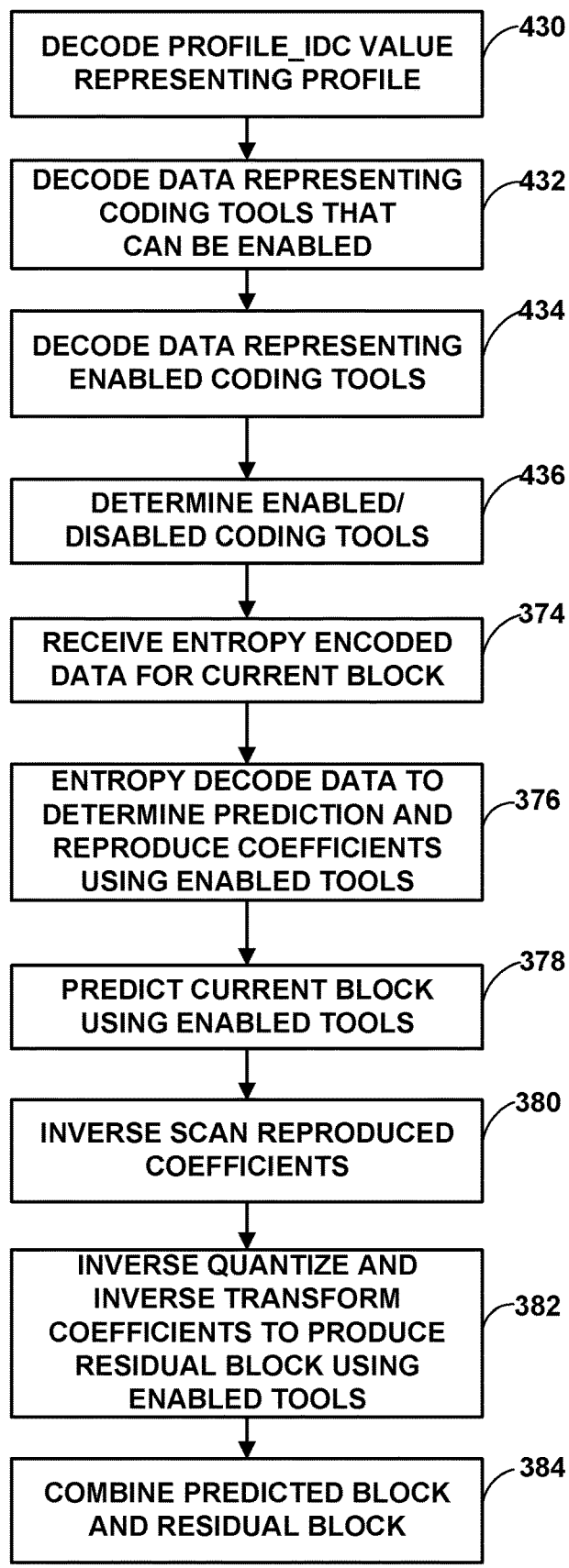
FIG. 8 is a flowchart illustrating an example method of decoding video data according to the techniques of this disclosure.

FIG. 8 is a flowchart illustrating an example method of decoding video data according to the techniques of this disclosure. Although described with respect to video decoder 300 (FIGS. 1 and 4), it should be understood that other devices may be configured to perform a method similar to that of FIG. 8.

Video decoder 300 may initially entropy decode a profile indicator (profile_idc) value of a sequence parameter set (SPS) representing a class of a profile to which a video bitstream conforms (430). Video decoder 300 may also entropy decode data representing coding tools that can be enabled (432), such as coding-tool-specific constraints indicating whether coding tools corresponding to the coding-tool-specific constraints can be enabled for at least a subset of the bitstream. Video decoder 300 may further decode data representing which of the coding tools that can be enabled are in fact enabled or disabled (434), and use this data to determine which coding tools are enabled or disabled (436).

Video decoder 300 may then decode pictures of a sequence of the video data according to the enabled and disabled coding tools and the profile to which the video bitstream conforms. For example, video decoder 300 may decode and reproduce the pictures on a block-by-block basis. Thus, video decoder 300 may initially receive entropy encoded data for a current block (374). The data may include prediction information (e.g., intra-prediction or motion information), as well as quantized transform coefficients for the current block.

Video decoder 300 may entropy decode the entropy encoded data to determine the prediction information and to reproduce the quantized transform coefficients using enabled coding tools (376). Video decoder 300 may form a prediction block for the current block using the enabled coding tools (378). Video decoder 300 may also inverse scan the reproduced coefficients to form a quantized transform block (380). Video decoder 300 may inverse quantize and inverse transform the coefficients to produce a residual block for the current block using the enabled coding tools (382), such as a secondary transform, a rotational transform, a DCT, a DST, a KLT, or the like. Video decoder 300 may then combine the predicted block and the residual block on a sample-by-sample basis to decode and reproduce the current block (384). Although not shown in FIG. 8, if ALF is enabled, video decoder 300 may also filter blocks of the picture using ALF, e.g., to reduce blockiness artifacts.

In this manner, the method of FIG. 8 represents an example of a method of decoding video data, the method including decoding a value for a profile indicator syntax element in a bitstream including video data, the value for the profile indicator representing a class of a profile to which the bitstream conforms; decoding one or more values representing one or more coding-tool-specific constraints, separate from the profile indicator syntax element, each of the coding-tool-specific constraints indicating whether coding tools corresponding to the coding-tool-specific constraints can be enabled for at least a subset of the bitstream; and decoding the video data according to the coding-tool-specific constraints and the class of the profile.

Certain techniques of this application are summarized in the following examples:

Example 1: A method of coding video data, the method comprising: determining a maximum value for a range of possible values for a profile indicator syntax element, the profile indicator syntax element representing a set of coding tools used to code video data of a bitstream; coding a value for the profile indicator syntax element in the bitstream, the value being less than the maximum value; determining one or more of the coding tools that are not used to code the video data of the bitstream, the one or more of the coding tools represented by the value for the profile indicator syntax element; and coding the video data using remaining coding tools of the set of coding tools, excluding the one or more of the coding tools represented by the value for the profile indicator syntax element.

Example 2: The method of example 1, wherein coding the value for the profile indicator syntax element comprises coding the value in a sequence parameter set (SPS) of the bitstream.

Example 3: The method of any of examples 1 and 2, wherein the value for the profile indicator syntax element comprises a binary value, each bit of the binary value representing whether one or more corresponding coding tools of the coding tools are enabled or disabled.

Example 4: The method of example 3, wherein at least one of the bits of the binary value represents whether a plurality of corresponding coding tools of the set of coding tools is enabled or disabled.

Example 5: The method of any of examples 1-3, wherein the value for the profile indicator syntax element comprises a binary value, each bit of the binary value representing whether a corresponding one of the coding tools is enabled or disabled.

Example 6: The method of any of examples 1-5, further comprising determining whether the bitstream can be decoded using the value for the profile indicator syntax element.

Example 7: The method of any of examples 1-6, wherein determining the one or more of the coding tools that are not used comprises applying a binary mask to the value for the profile indicator syntax element.

Example 8: The method of any of examples 1-7, wherein determining the one or more of the coding tools that are not used comprises applying a bitwise shift operation to the value for the profile indicator syntax element.

Example 9: The method of any of examples 1-8, wherein determining the one or more of the coding tools that are not used comprises applying an offset to the value for the profile indicator syntax element.

Example 10: The method of any of examples 1-9, wherein the value for the profile indicator syntax element comprises a binary or exponential structure.

Example 11: The method of any of examples 1-10, wherein coding the video data comprises decoding the video data, wherein coding the value for the profile indicator syntax element comprises decoding the value for the profile indicator syntax element, and wherein determining the one or more coding tools that are not used comprises determining the one or more coding tools that are not used from the value for the profile indicator syntax element.

Example 12: The method of any of examples 1-11, wherein coding the video data comprises encoding the video data, and wherein coding the value for the profile indicator syntax element comprises: determining the value that represents the one or more coding tools that are not used; and encoding the value for the profile indicator syntax element.

Example 13: A method of coding video data, the method comprising: coding a value for a profile indicator syntax element in a bitstream, the value for the profile indicator representing a class of a profile to which the bitstream conforms; coding data for a syntax element representing one or more tool-specific constraints, separate from the profile indicator syntax element; and coding video data according to the tool-specific constraints.

Example 14: The method of example 13, further comprising coding a value for a syntax element representing that tool-specific enabling/disabling indications are signaled in the bitstream.

Example 15: The method of example 14, wherein the syntax element representing that the tool-specific enabling/disabling indications are signaled comprises constrained_tool_indication_flag.

Example 16: The method of any of examples 14 and 15, wherein the value for the syntax element representing that the tool-specific enabling/disabling indications are signaled has a predefined value according to the value for the profile indicator syntax element.

Example 17: The method of any of examples 14-16, wherein the value for the syntax element representing that the tool-specific enabling/disabling indications are signaled indicates that all of the tools corresponding to the tool-specific constraints are disabled when the value for the profile indicator syntax element indicates that the bitstream conforms to a baseline profile.

Example 18: The method of any of examples 13-17, wherein the syntax element representing the one or more tool-specific constraints comprises a constrained_tool_val syntax element.

Example 19: The method of any of examples 13-18, wherein the syntax element representing the one or more tool-specific constraints comprises a plurality of bits, each of the bits having a binary value representing whether a corresponding tool is enabled or disabled.

Example 20: The method of any of examples 13-19, further comprising deriving a value for a tool variable representing whether a coding tool is enabled or disabled using at least one of the value for the profile indicator syntax element or the data for the syntax element representing the one or more tool-specific constraints.

Example 21: The method of any of examples 13-20, wherein coding comprises decoding.

Example 22: The method of any of examples 13-21, wherein coding comprises encoding.

Example 23: A device for coding video data, the device comprising one or more means for performing the method of any of examples 1-22.

Example 24: The device of example 23, wherein the one or more means comprise one or more processors.

Example 25: The device of example 23, further comprising a display configured to display the video data.

Example 26: The device of example 23, wherein the device comprises one or more of a camera, a computer, a mobile device, a broadcast receiver device, or a set-top box.

Example 27: The device of example 23, further comprising a memory configured to store the video data.

Example 28: The device of example 23, further comprising a camera configured to capture the video data.

Example 29: The device of example 23, wherein the device comprises at least one of: an integrated circuit; a microprocessor; or a wireless communication device.

Example 30: A computer-readable storage medium having stored thereon instructions that, when executed, cause a processor to perform the method of any of examples 1-22.

Example 31: A device for decoding video data, the device comprising: means for determining a maximum value for a range of possible values for a profile indicator syntax element, the profile indicator syntax element representing a set of coding tools used to code video data of a bitstream; means for coding a value for the profile indicator syntax element in the bitstream, the value being less than the maximum value; means for determining one or more of the coding tools that are not used to code the video data of the bitstream, the one or more of the coding tools represented by the value for the profile indicator syntax element; and means for coding the video data using remaining coding tools of the set of coding tools, excluding the one or more of the coding tools represented by the value for the profile indicator syntax element.

Example 32: A device for coding video data, the device comprising: means for coding a value for a profile indicator syntax element in a bitstream, the value for the profile indicator representing a class of a profile to which the bitstream conforms; means for coding data for a syntax element representing one or more tool-specific constraints, separate from the profile indicator syntax element; and means for coding video data according to the tool-specific constraints.

It is to be recognized that depending on the example, certain acts or events of any of the techniques described herein can be performed in a different sequence, may be added, merged, or left out altogether (e.g., not all described acts or events are necessary for the practice of the techniques). Moreover, in certain examples, acts or events may be performed concurrently, e.g., through multi-threaded processing, interrupt processing, or multiple processors, rather than sequentially.

In one or more examples, the functions described may be implemented in hardware, software, firmware, or any combination thereof. If implemented in software, the functions may be stored on or transmitted over as one or more instructions or code on a computer-readable medium and executed by a hardware-based processing unit. Computer-readable media may include computer-readable storage media, which corresponds to a tangible medium such as data storage media, or communication media including any medium that facilitates transfer of a computer program from one place to another, e.g., according to a communication protocol. In this manner, computer-readable media generally may correspond to (1) tangible computer-readable storage media which is non-transitory or (2) a communication medium such as a signal or carrier wave. Data storage media may be any available media that can be accessed by one or more computers or one or more processors to retrieve instructions, code and/or data structures for implementation of the techniques described in this disclosure. A computer program product may include a computer-readable medium.

By way of example, and not limitation, such computer-readable storage media can comprise RAM, ROM, EEPROM, CD-ROM or other optical disk storage, magnetic disk storage, or other magnetic storage devices, flash memory, or any other medium that can be used to store desired program code in the form of instructions or data structures and that can be accessed by a computer. Also, any connection is properly termed a computer-readable medium. For example, if instructions are transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. It should be understood, however, that computer-readable storage media and data storage media do not include connections, carrier waves, signals, or other transitory media, but are instead directed to non-transitory, tangible storage media. Disk and disc, as used herein, includes compact disc (CD), laser disc, optical disc, digital versatile disc (DVD), floppy disk and Blu-ray disc, where disks usually reproduce data magnetically, while discs reproduce data optically with lasers. Combinations of the above should also be included within the scope of computer-readable media.

Instructions may be executed by one or more processors, such as one or more digital signal processors (DSPs), general purpose microprocessors, application specific integrated circuits (ASICs), field programmable gate arrays (FPGAs), or other equivalent integrated or discrete logic circuitry. Accordingly, the terms "processor" and "processing circuitry," as used herein may refer to any of the foregoing structures or any other structure suitable for implementation of the techniques described herein. In addition, in some aspects, the functionality described herein may be provided within dedicated hardware and/or software modules configured for encoding and decoding, or incorporated in a combined codec. Also, the techniques could be fully implemented in one or more circuits or logic elements.

The techniques of this disclosure may be implemented in a wide variety of devices or apparatuses, including a wireless handset, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a codec hardware unit or provided by a collection of interoperative hardware units, including one or more processors as described above, in conjunction with suitable software and/or firmware.

Various examples have been described. These and other examples are within the scope of the following claims.

What is claimed is:

1. A method of coding video data, the method comprising:
coding a value for a profile indicator syntax element in a bitstream including video data, the value for the profile indicator representing a class of a profile to which the bitstream conforms;
coding a single value representing a plurality of coding-tool-specific constraints, separate from the profile indicator syntax element, the single value being represented by a plurality of bits, each of the bits corresponding to one of the coding-tool-specific constraints, each of the coding-tool-specific constraints indicating whether coding tools corresponding to the coding-tool-specific constraints can be enabled for at least a subset of the bitstream according to a value of the one of the bits for the corresponding one of the coding-tool-specific constraints; and
coding the video data according to the coding-tool-specific constraints and the class of the profile.

2. The method of claim 1, further comprising coding a value for a syntax element representing that coding-tool-specific enabling/disabling indications are signaled in the bitstream.

3. The method of claim 2, wherein the syntax element representing that the coding-tool-specific enabling/disabling indications are signaled comprises a constrained_tool_indication_flag.

4. The method of claim 2, wherein the value for the syntax element representing that the coding-tool-specific enabling/disabling indications are signaled has a predefined value according to the value for the profile indicator syntax element.

5. The method of claim 2, wherein the value for the syntax element representing whether the coding-tool-specific enabling/disabling indications are signaled indicates that all of the tools corresponding to the coding-tool-specific constraints are disabled when the value for the profile indicator syntax element indicates that the bitstream conforms to a baseline profile.

6. The method of claim 2, further comprising, for each of the coding tools that can be enabled as indicated by the coding-tool-specific constraints, coding values for syntax elements representing the coding-tool-specific enabling/disabling indications, without coding values for syntax elements representing the coding-tool-specific enabling/disabling indications for coding tools that cannot be enabled as indicated by the coding-tool-specific constraints.

7. The method of claim 6, wherein the syntax elements representing the coding-tool-specific enabling/disabling indications comprise respective constrained_tool_val syntax elements.

8. The method of claim 1, further comprising deriving a value for a coding tool variable representing whether one of the coding tools is enabled or disabled using at least one of the value for the profile indicator syntax element or the single value representing the one or more plurality of coding-tool-specific constraints.

9. The method of claim 1, wherein coding the single value representing the plurality of coding-tool-specific constraints comprises coding a single value for a toolset indicator representing a set of constraints to which the bitstream conforms.

10. The method of claim 1, wherein coding the video data comprises decoding the video data.

11. The method of claim 1, wherein coding the video data comprises encoding the video data.

12. A device for coding video data, the device comprising:
a memory configured to store video data; and
one or more processors implemented in circuitry and configured to:
code a value for a profile indicator syntax element in a bitstream including video data, the value for the profile indicator representing a class of a profile to which the bitstream conforms;
code a single value representing a plurality of coding-tool-specific constraints, separate from the profile indicator syntax element, the single value being represented by a plurality of bits, each of the bits corresponding to one of the coding-tool-specific constraints, each of the coding-tool-specific constraints indicating whether coding tools corresponding to the coding-tool-specific constraints can be enabled for at least a subset of the bitstream according to a value of the one of the bits for the corresponding one of the coding-tool-specific constraints; and
code the video data according to the coding-tool-specific constraints and the class of the profile.

13. The device of claim 12, wherein the one or more processors are further configured to code a value for a syntax element representing that coding-tool-specific enabling/disabling indications are signaled in the bitstream.

14. The device of claim 13, wherein the syntax element representing that the coding-tool-specific enabling/disabling indications are signaled comprises a constrained_tool_indication_flag.

15. The device of claim 13, wherein the value for the syntax element representing that the coding-tool-specific enabling/disabling indications are signaled has a predefined value according to the value for the profile indicator syntax element.

16. The device of claim 13, wherein the value for the syntax element representing whether the coding-tool-specific enabling/disabling indications are signaled indicates that all of the tools corresponding to the coding-tool-specific constraints are disabled when the value for the profile indicator syntax element indicates that the bitstream conforms to a baseline profile.

17. The device of claim 13, wherein the one or more processors are configured to, for each of the coding tools that can be enabled as indicated by the coding-tool-specific constraints, code values for syntax elements representing the coding-tool-specific enabling/disabling indications, without coding values for syntax elements representing the coding-tool-specific enabling/disabling indications for coding tools that cannot be enabled as indicated by the coding-tool-specific constraints.

18. The device of claim 17, wherein the syntax elements representing the coding-tool-specific enabling/disabling indications comprise respective constrained_tool_val syntax elements.

19. The device of claim 12, wherein the one or more processors are further configured to derive a value for a coding tool variable representing whether one of the coding tools is enabled or disabled using at least one of the value for the profile indicator syntax element or the single value representing the plurality of coding-tool-specific constraints.

20. The device of claim 12, wherein to code the single value representing the plurality of coding-tool-specific constraints, the one or more processors are configured to code a single value for a toolset indicator representing a set of constraints to which the bitstream conforms.

21. The device of claim 12, wherein the device comprises a video decoder, and wherein the one or more processors are configured to decode the video data.

22. The device of claim 12, wherein the device comprises a video encoder, and wherein the one or more processors are configured to encode the video data.

23. The device of claim 12, further comprising a display configured to display the video data.

24. The device of claim 12, wherein the device comprises one or more of a camera, a computer, a mobile device, a broadcast receiver device, or a set-top box.

25. The device of claim 12, wherein the device comprises at least one of:
an integrated circuit;
a microprocessor; or
a wireless communication device.

26. A non-transitory computer-readable storage medium having stored thereon instructions that, when executed, cause a processor to:
code a value for a profile indicator syntax element in a bitstream including video data, the value for the profile indicator representing a class of a profile to which the bitstream conforms;
code a single value representing a plurality of coding-tool-specific constraints, separate from the profile indicator syntax element, the single value being represented by a plurality of bits, each of the bits corresponding to one of the coding-tool-specific constraints, each of the coding-tool-specific constraints indicating whether coding tools corresponding to the coding-tool-specific constraints can be enabled for at least a subset of the bitstream according to a value of the one of the bits for the corresponding one of the coding-tool-specific constraints; and
code the video data according to the coding-tool-specific constraints and the class of the profile.

27. The non-transitory computer-readable storage medium of claim 26, further comprising instructions that cause the processor to code a value for a syntax element representing that coding-tool-specific enabling/disabling indications are signaled in the bitstream.

28. The non-transitory computer-readable storage medium of claim 27, wherein the syntax element representing that the coding-tool-specific enabling/disabling indications are signaled comprises a constrained_tool_indication_flag.

29. The non-transitory computer-readable storage medium of claim 27, wherein the value for the syntax element representing that the coding-tool-specific enabling/disabling indications are signaled has a predefined value according to the value for the profile indicator syntax element.

30. The non-transitory computer-readable storage medium of claim 27, wherein the value for the syntax element representing whether the coding-tool-specific enabling/disabling indications are signaled indicates that all of the tools corresponding to the coding-tool-specific constraints are disabled when the value for the profile indicator syntax element indicates that the bitstream conforms to a baseline profile.

31. The non-transitory computer-readable storage medium of claim 27, further comprising instructions that cause the processor to, for each of the coding tools that can be enabled as indicated by the coding-tool-specific constraints, code values for syntax elements representing the coding-tool-specific enabling/disabling indications, without coding values for syntax elements representing the coding-tool-specific enabling/disabling indications for coding tools that cannot be enabled as indicated by the coding-tool-specific constraints.

32. The non-transitory computer-readable storage medium of claim 31, wherein the syntax elements representing the coding-tool-specific enabling/disabling indications comprise respective constrained_tool_val syntax elements.

33. The non-transitory computer-readable storage medium of claim 26, further comprising instructions that cause the processor to derive a value for a coding tool variable representing whether one of the coding tools is enabled or disabled using at least one of the value for the profile indicator syntax element or the single value representing the plurality of coding-tool-specific constraints.

34. The non-transitory computer-readable storage medium of claim 26, wherein the instructions that cause the processor to code the single value representing the plurality of coding-tool-specific constraints comprise instructions that cause the processor to code a single value for a toolset indicator representing a set of constraints to which the bitstream conforms.

35. The non-transitory computer-readable storage medium of claim 26, wherein the instructions that cause the processor to code the video data comprise instructions that cause the processor to decode the video data.

36. The non-transitory computer-readable storage medium of claim 26, wherein the instructions that cause the processor to code the video data comprise instructions that cause the processor to encode the video data.

37. A device for decoding video data, the device comprising:
means for coding a value for a profile indicator syntax element in a bitstream including video data, the value for the profile indicator representing a class of a profile to which the bitstream conforms;
means for coding a single value representing a plurality of coding-tool-specific constraints, separate from the profile indicator syntax element, the single value being represented by a plurality of bits, each of the bits corresponding to one of the coding-tool-specific constraints, each of the coding-tool-specific constraints indicating whether coding tools corresponding to the coding-tool-specific constraints can be enabled for at least a subset of the bitstream according to a value of the one of the bits for the corresponding one of the coding-tool-specific constraints; and
means for coding the video data according to the coding-tool-specific constraints and the class of the profile.

* * * * *